United States Patent
Lohmar et al.

(10) Patent No.: US 11,483,847 B2
(45) Date of Patent: Oct. 25, 2022

(54) DYNAMIC PRIORITIZATION FOR LIVE STREAMING

(71) Applicant: Telefonaktiebolaget LM Ericsson (publ), Stockholm (SE)

(72) Inventors: Thorsten Lohmar, Aachen (DE); Aldo Bolle, Västra Frölunda (SE); Bo Burman, Upplands Väsby (SE); Ann-Christine Eriksson, Enköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 154 days.

(21) Appl. No.: 16/962,741

(22) PCT Filed: Jan. 30, 2019

(86) PCT No.: PCT/IB2019/050761
§ 371 (c)(1),
(2) Date: Jul. 16, 2020

(87) PCT Pub. No.: WO2019/150286
PCT Pub. Date: Aug. 8, 2019

(65) Prior Publication Data
US 2020/0359395 A1    Nov. 12, 2020

Related U.S. Application Data

(60) Provisional application No. 62/623,598, filed on Jan. 30, 2018.

(51) Int. Cl.
*H04W 72/12* (2009.01)
*H04W 24/02* (2009.01)

(52) U.S. Cl.
CPC ....... *H04W 72/1231* (2013.01); *H04W 24/02* (2013.01)

(58) Field of Classification Search
CPC . H04L 65/4069; H04L 47/24; H04L 47/2416; H04L 65/80; H04W 72/1231;
(Continued)

(56) References Cited

U.S. PATENT DOCUMENTS

2010/0046369 A1  2/2010  Zhao et al.
2017/0317894 A1  11/2017 Dao et al.

FOREIGN PATENT DOCUMENTS

CN    101064635 A    10/2007
CN    107005423 A    8/2017
(Continued)

OTHER PUBLICATIONS

Chinese Office Action issued for Application No. 201980010901—dated Jan. 6, 2022.
(Continued)

*Primary Examiner* — Mandish K Randhawa
(74) *Attorney, Agent, or Firm* — Baker Botts, LLP

(57) ABSTRACT

According to certain embodiments, a method by a first network node operating as a Radio Access Network (RAN) node for dynamic scheduling prioritization for live uplink streaming includes receiving at least one priority level. Based on the at least one priority level, an expected quality level is determined. The expected quality level is defined as a Quality of Service (QoS) of a QoS flow being scheduled with a service quality above a minimum quality level and below a maximum quality level. A current service quality for a plurality of QoS flows is determined. Based on the combined current service quality and the expected quality level, a scheduling priority for assigning resources to a plurality of QoS flows is determined.

26 Claims, 26 Drawing Sheets

(58) Field of Classification Search
CPC .............. H04W 28/0268; H04W 24/02; H04W 28/0252
See application file for complete search history.

(56) References Cited

FOREIGN PATENT DOCUMENTS

| WO | 2017 193970 A1 | 11/2017 |
|---|---|---|
| WO | 2017 196386 A1 | 11/2017 |

OTHER PUBLICATIONS

Review on SOA of Quality of Service Research by Zhao Sheng-hui et al., vol. 36, No. 4—Apr. 2009.

SA WG2 Meeting #115; Nanjing, P.R. China; Source: Huawei, HiSilicon; Title: Updates to "Solution 2.3: Content requirement Aware QoS Framework" (S2-162564)—May 23-27, 2016.

3GPP TS 23.401 v15.1.0; Technical Specification; 3rd Generation Partnership Project; Technical Specification Group Services and System Aspects; General Packet Radio Service (GPRS) enhancements for Evolved Universal Terrestrial Radio Access Network (E-UTRAN) access (Release 15).

3GPP TS 23.501 v2.1.0; Technical Specification; 3rd Generation Partnership Project; Technical Specification Group Services and System Aspects; System Architecture for the 5G System; Stage 2 (Release 15).

3GPP TS 23.502 v2.2.0; 3rd Generation Partnership Project; Technical Specification Group Services and System Aspects; Procedurs for the 5G System; Stage 2 (Release 15)—Dec. 2017.

PCT International Search Report issued for International application No. PCT/IB2019/050761—dated May 15, 2019.

PCT Written Opinion of the International Searching Authority for International application No. PCT/IB2019/050761—dated May 15, 2019.

DYNAMIC PRIORITIZATION FOR LIVE STREAMING

PRIORITY

This nonprovisional application is a U.S. National Stage Filing under 35 U.S.C. § 371 of International Patent Application Serial No. PCT/IB2019/050761 filed Jan. 30, 2019 and entitled "Dynamic Prioritization for Live Streaming" which claims priority to U.S. Provisional Patent Application No. 62/623,598 filed Jan. 30, 2018 both of which are hereby incorporated by reference in their entirety.

TECHNICAL FIELD

Certain embodiments of the present disclosure relate, in general, to wireless communications and more particularly to dynamic prioritization for live streaming.

BACKGROUND

3GPP SA4 has started to create a Framework for Live Uplink Streaming. The framework is documented in TS 26.238. The framework allows usage of IMS based media and also non-IMS based media streams for uplink. The enabler allows for configurable delay constraints. The objective of the work also includes Quality of Service for Uplink video streaming. However, it is not clear, how the 3GPP QoS parameters (i.e. GBR, MBR, QCI, 5QI, ARP, etc.) should be set.

There are many different scenarios, where Live Uplink Video can be used today. Not all scenarios have real-time communication like delay requirements, since not always an immediate feedback loop (closed loop) is involved. When the delay constraints are (a bit) relaxed, then either the bitrate or the video quality or both can be optimized.

A number of different scenarios where identified during the work on Live Uplink Video Streaming. The initial use case (which motivated the work item) was "Live video capturing from self-flying drones for TV distribution": Here, an event organizer would fly the drones (follow-me drones, following e.g. a downhill skier) in order to create additional live video footages for the TV broadcast.

Additional use-cases from User-Generated Content (consumer segment), surveillance/CCTV (future rail-ways, public safety, industry automatization, etc.) and media production were identified.

In several use-cases, a single business partner may interact with a single mobile operator for live uplink video services. In these cases, the business partner may also desire to experience a more sustainable and predictable QoS performance from the mobile network link.

For Live Uplink Streaming, e.g. for professional media production vertical, the 3GPP QoS system needs to strive to fulfil throughput requirements of the video flows beyond the guaranteed bit rate. The 3GPP Quality of Service (QoS) system also needs to be very flexible. Professional Media Production vertical requires fairly high media bitrates in order to achieve a decent video quality in downlink. Often, uncompressed or lightly compressed video is carried at speeds of several Gigabit per second.

The Professional Media Production vertical (for example) requires fairly high media bitrates in order to achieve a decent video quality in downlink. In professional media production, uncompressed or lightly compressed video is carried often at speeds of several Gigabit per second (cf. SDI bitrates). This is of course often not feasible for mobile video production, in particular when mobility and wide-area coverage are important features (i.e. when deploying a dedicated LTE cells inside of a media production facility, it could make sense to send uncompressed or lightly compressed frames.

For mobile production, the speed of production and the speed of setting up a live feed (i.e. speed and simplification of production) and the freedom of high mobility is likely more important than high video quality at ultra-low latency and high bit rates. Compressed video streams can be used at expense of latency (compression efficiency increases when relaxing latency constrains). Still, the video quality should be high.

FIG. 1 illustrates the desired video quality properties (and the resulting bitrates), as an example. The expectation is that the system delivers a certain target quality. Preferably, that target quality is always or as often as possible delivered and the target bit rate should be sustained by the system for a certain time duration. A higher quality than the target quality is not needed. Depending on the video codec configuration such as, codec Profile, codec level and other encoder features, the video quality is associated with a bit rate of the compressed stream.

When the system cannot offer the desired target bitrate, a lower bitrate is then acceptable for the video application. The video application layer (e.g. IP Multimedia Subsystem (IMS)/Multimedia Telephony Service (MTSI), Hypertext Transfer Protocol (HTTP) or others) supports adaptive bitrate adaptation. For example, the video application layer may increase or decrease the quality to match whatever link bitrate is available.

A certain large bitrate range leads to an acceptable quality. In the example depicted in FIG. 1, a resulting video bitrate of approximately Mbps corresponds to the target video quality, which falls within the "as expected" area. Just below that is corresponds to an "ok" quality. The resulting quality is not perfect, but still good enough to use. The lower end of the bitrate range is the "better than nothing" area, where the video quality contains very obvious quality artifacts.

When the system cannot even offer the lowest quality (here, 800 kbps), the media producer will terminate the video stream due to unusable quality. The video source may then stop sending the video stream since the server is discarding the content.

The actual quality thresholds depend on the use-cases. The lowest unusable quality threshold is certainly lower for breaking news scenarios than for regular reports. Further, when the camera is mobile, such as when it is mounted on a car or a downhill racing skier, the acceptable quality is certainly different than for fixed mounted cameras.

The ability to deliver data packets over a 5G network with differentiated priority is achieved via the 5G QoS framework described in 3GPP 23.501 and leverage on the association of QoS parameters to the data delivered to and by the Access Network. In the context of the techniques described herein, three QoS parameters are relevant:

The 5G QoS Identifier (5QI), a scalar that is used as a reference to 5G QoS characteristics i.e. the packet forwarding treatment that a QoS Flow receives edge-to-edge across the 5G network including the "Priority level" indicating a priority in scheduling resources among QoS Flows.

The Guaranteed Flow Bit Rate (GFBR) denoting the bit rate that may be expected to be provided by a QoS Flow.

The Maximum Flow Bit Rate (MFBR) limiting the bit rate that may be expected to be provided by a Guaranteed Bit rate (GBR) QoS Flow (e.g. excess traffic may get discarded by a rate shaping function).

Similar parameters are defined for Evolved Packet System (EPS) such as, for example, QoS Class Identifier (QCI), GBR and Maximum Bit Rate (MBR), in 3GPP 23.401.

FIG. 2 illustrates the Dedicated Bearer Activation Procedure in 3GPP 23.401. More specifically, FIG. 2 illustrates how in EPS the requested differentiation to be provided through the QoS parameters of a bearer are signaled. Though EPS procedures for establishing an EPS bearer are shown, equivalent procedures are standardized for 5GS.

FIG. 3 illustrates UE or network requested PDU Session Modification in 3GPP 23.502. Specifically, FIG. 3 illustrates how in 5GS the requested differentiation to be provided through the QoS parameters of a QoS flow are signaled.

There currently exist certain challenge(s). For example, today, 3GPP specifies the priority level associated to the QoS Class Identifier (5QI/QCI) to be used to differentiate between traffic within a UE and across different UEs up to the GFBR/GBR value. For example, 3GPP 23.501 states that "[o]nce all QoS requirements are fulfilled for the GBR QoS Flows, spare resources can be used for any remaining traffic in an implementation specific manner." However, 3GPP 23.501 does not define a behavior for a scheduling priority to achieve a "target quality bitrate" larger than GFBR/GBR, but less than MFBR/MBR. Rather, the specification only focus on a general resource distribution not related to the useful target bitrate. Moreover, in many implementations, the 5QI/QCI priority level is ignored, when the bitrate is larger GFBR/GBR, leading to a best effort behavior for bit rates larger than the GBR. FIG. 4 illustrates today's priority levels, which go best effort when above GBR.

A video service is conceived to typically operate far beyond GFBR/GBR and very close to MFBR/MBR. If the GFBR/GBR of 3GPP flow/bearer aimed to carry the video traffic is set to the barely acceptable quality level, the scheduling priority will only prioritize the data up to the GFBR/GBR and not really be beneficial to provide bitrates close to the expected service quality. In this case, as the behavior for traffic between GFBR/GBR and MFBR/MBR is equal to best-effort MBB, then it is probably equivalent to skip QoS and just use the Best Effort MBB flow/bearer (which is likely also cheaper) for the video traffic.

If on the other hand the GFBR/GBR value of the of 3GPP flow/bearer aimed to carry the video traffic is set to the expected quality level, the scheduling priority would lead to the scheduler to prioritize the video traffic up to the expected quality level at the cost of more radio resource consumption and reducing the room for the rate adaptation capabilities of the video traffic. While it is clearly desirable to use the expected quality, the needed quality/cost trade-off is less optimal in this case, since the cost to guarantee the expected quality at all times can easily become too high.

Additionally, there is an increased risk, that the system is rejecting/dropping the QoS bearer. Specifically, with regard to the usage of the 3GPP QoS framework, the system admission control is going to reject/pre-empt a QoS bearer based on the GBR value. In order to get a QoS bearer accepted, the GBR value should be selected as the lowest acceptable bitrate. With increasing GBR value, also the risk is increasing that the system admission control is rejecting/ pre-empty QoS bearers based on the GBR value. Note, handovers to other cells/other access networks may retrigger the admission control process.

The MBR is limiting the bitrate of the QoS bearer. In some implementations, the system is dropping traffic when the service bitrate is above MBR. Thus, due to bustiness of video traffic and when a bitrate adaptation principle is available, the MBR should be much larger than the GBR.

The (video) application layer will to tear-down the delivery of the data, when the bitrate (and the resulting quality) falls below the lower threshold, which is indicated as GBR in the figure below. The preferred service operation point (called target bitrate, TBR) is much higher than the GBR and likely close to the MBR. The FLUS source may adapt the media bitrate to the current estimated link bitrate.

In summary, the existing 5GS and EPS QoS frameworks focus on fulfilling the GFBR/GBR and make use of the MFBR/MBR only to limit the bit rate offered by the network and protect the network, failing to provide a useful differentiation of data traffic up to the expected quality bit rate.

SUMMARY

Certain aspects of the present disclosure and their embodiments may provide solutions to these or other challenges by introducing a graceful scheduling prioritization behavior when traffic bitrate is above Guaranteed Flow Bit Rate (GFBR)/Guaranteed Bit Rate (GBR) but below Maximum Flow Bit Rate (MFBR)/Maximum Bit Rate (MBR) to provide an "expected quality bitrate."

According to certain embodiments, a method by a first network node operating as a Radio Access Network (RAN) node for dynamic scheduling prioritization for live uplink streaming includes receiving at least one priority level. Based on the at least one priority level, an expected quality level is determined. The expected quality level is defined as a Quality of Service (QoS) of a QoS flow being scheduled with a service quality above a minimum quality level and below a maximum quality level. A current service quality for a plurality of QoS flows is determined. Based on the combined current service quality and the expected quality level, a scheduling priority for assigning resources to a plurality of QoS flows is determined.

According to certain embodiments, a first network node is provided dynamic scheduling prioritization for live uplink streaming. The first network node includes processing circuitry configured to receive at least one priority level. Based on the at least one priority level, an expected quality level is determined. The expected quality level is defined as a Quality of Service (QoS) of a QoS flow being scheduled with a service quality above a minimum quality level and below a maximum quality level. A current service quality for a plurality of QoS flows is determined. Based on the combined current service quality and the expected quality level, a scheduling priority for assigning resources to a plurality of QoS flows is determined.

According to certain embodiments, a method by a first network node operating as a Core Network node for dynamic scheduling prioritization for live uplink streaming is provided. The method includes transmitting, to a second network node operating as a RAN node, at least one priority level and at least one target bit rate for assigning resources to a plurality of Quality of Service (QoS) flows.

According to certain embodiments, a network node is provided for dynamic scheduling prioritization for live downlink streaming. The network node includes processing circuitry configured to transmit, to a second network node operating as a RAN node, at least one priority level and at least one target bit rate for assigning resources to a plurality of QoS flows Certain embodiments may provide one or more of the following technical advantage(s). As an example, an advantage of certain embodiments may include a graceful scheduling prioritization behavior when traffic bitrate is above GFBR/GBR but below MFBR/MBR to provide an "expected quality bitrate." For example, an advantage may be that the scheduling priority decreases according to a formula from the scheduling priority at GFBR/GBR down to zero, when traffic bitrate reaches MFBR/MBR. As another example, an advantage may be a new signaled parameter so that RAN scheduler nodes may be aware about the traffic priority behavior between GFBR/GBR and MFBR/MBR.

Certain embodiments may include none, some, or all of these advantages. Certain embodiments may include other advantages, as would be understood by a person having ordinary skill in the art.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
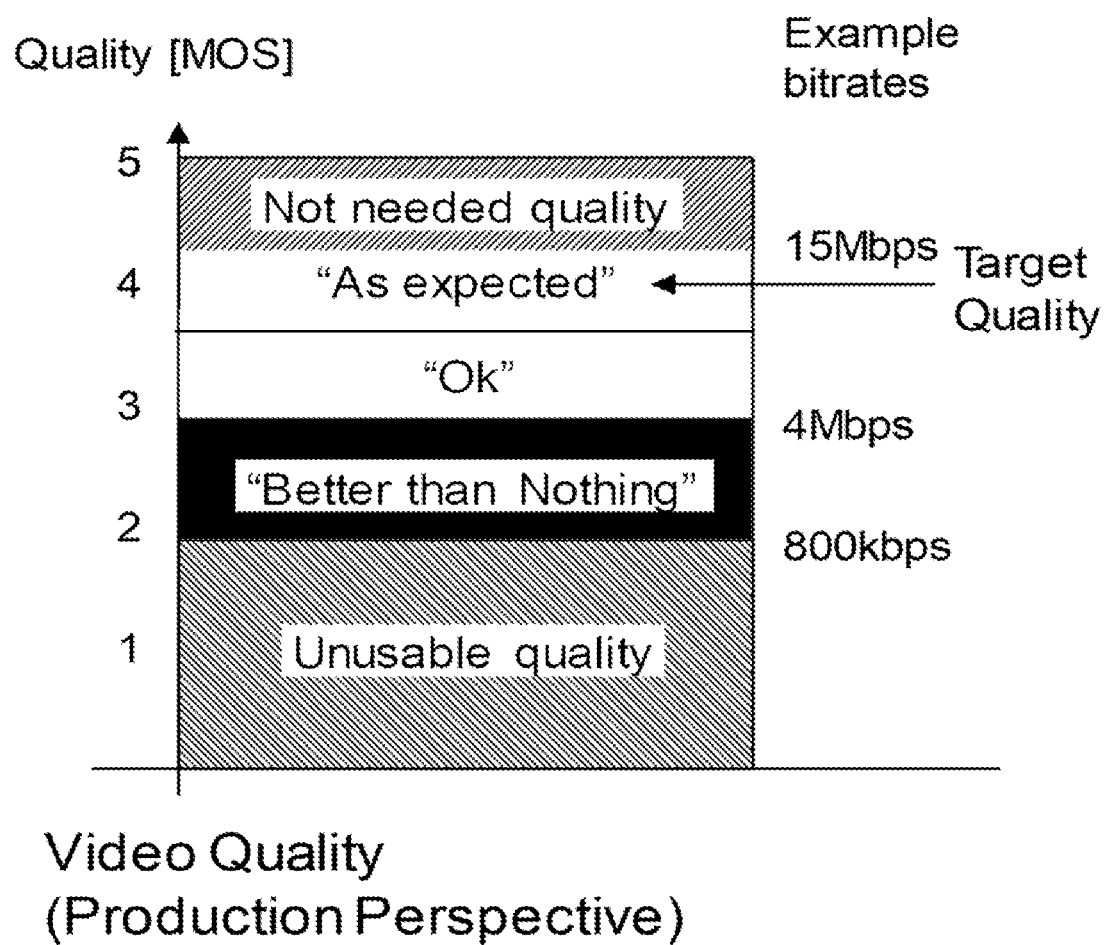
FIG. 1 illustrates the desired video quality properties (and the resulting bitrates), as an example.
Figure 2:
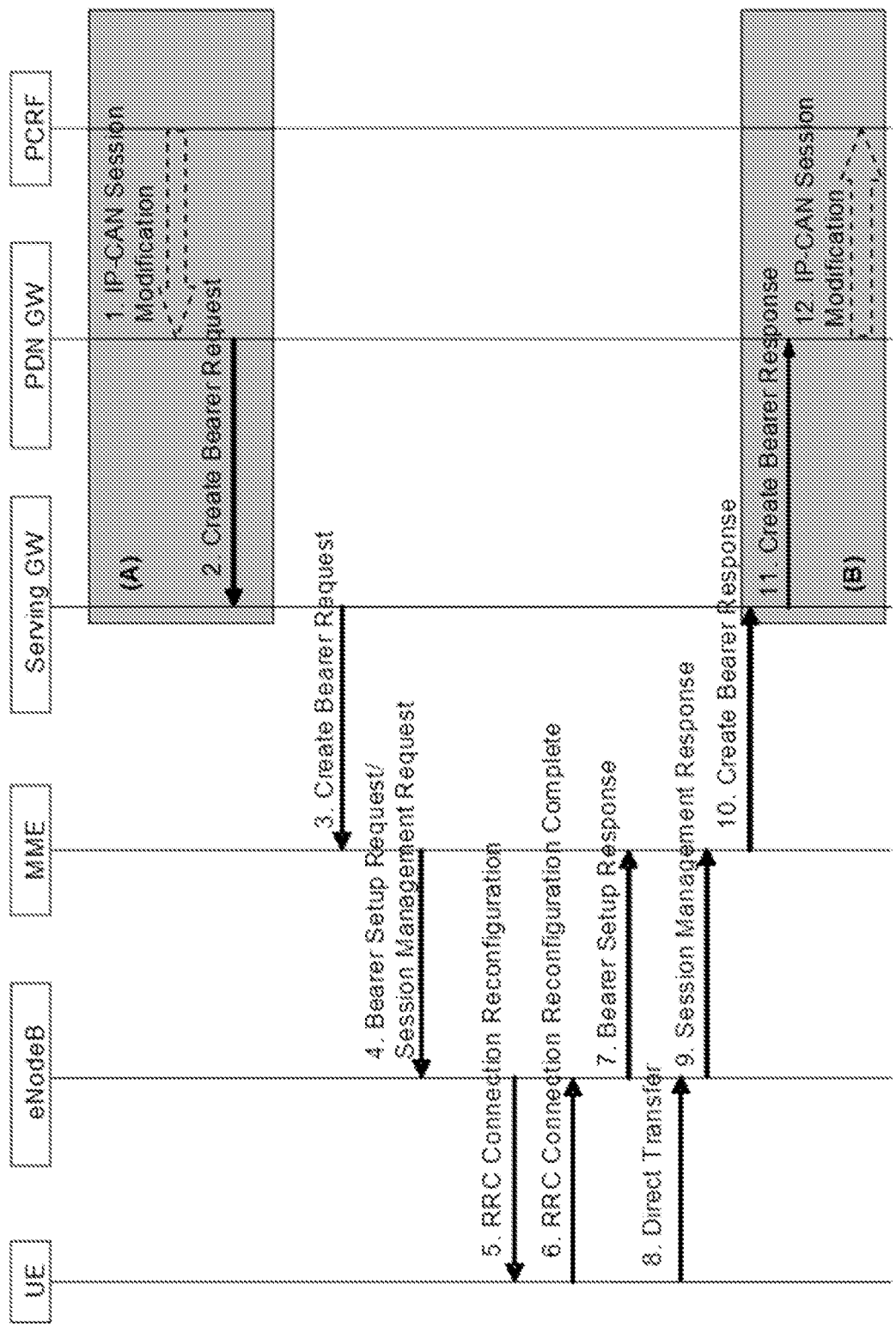
FIG. 2 illustrates the Dedicated Bearer Activation Procedure in 3GPP 23.401.
Figure 3A:
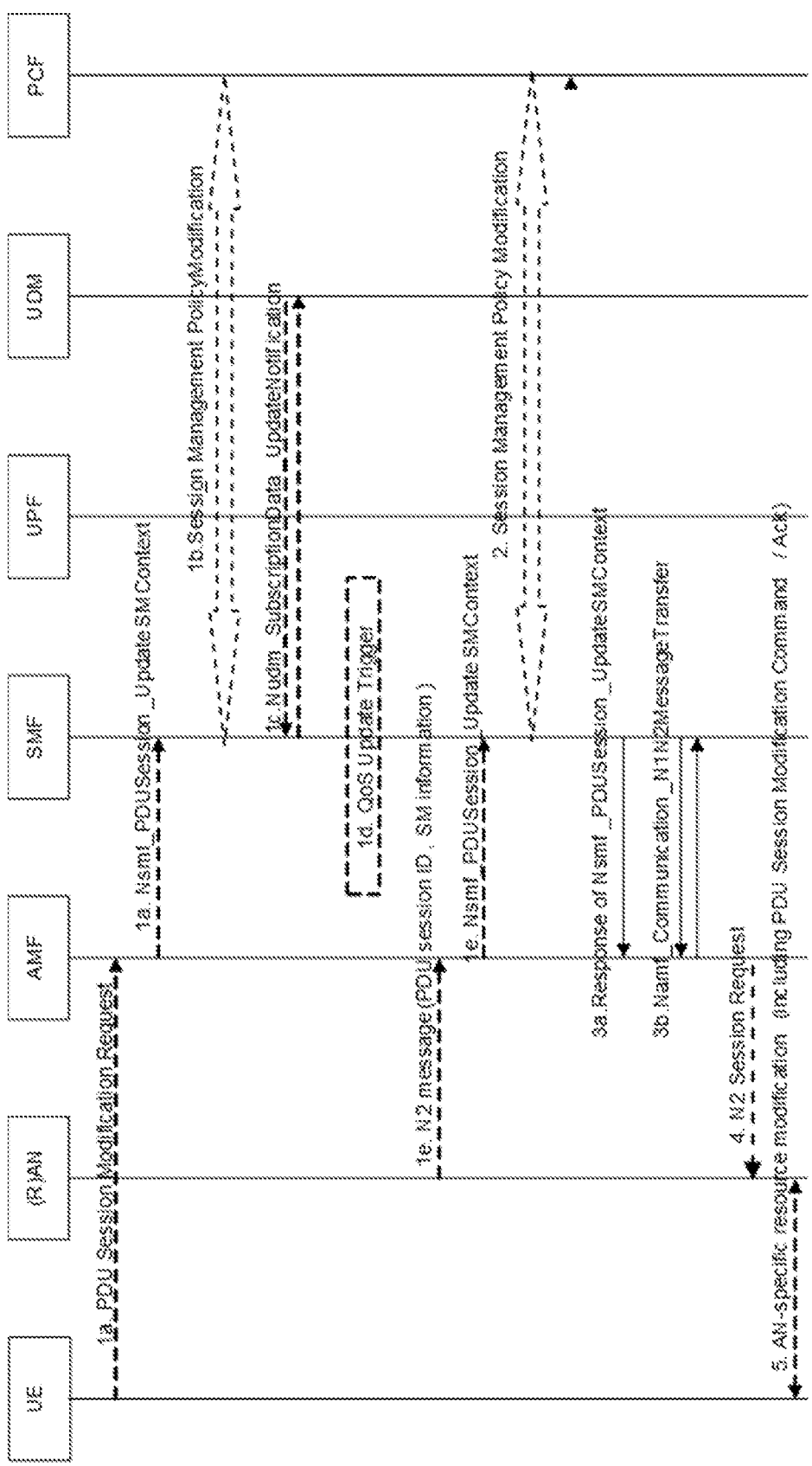
FIGS. 3A-3B illustrates UE or network requested PDU Session Modification in 3GPP 23.502.
Figure 3B:
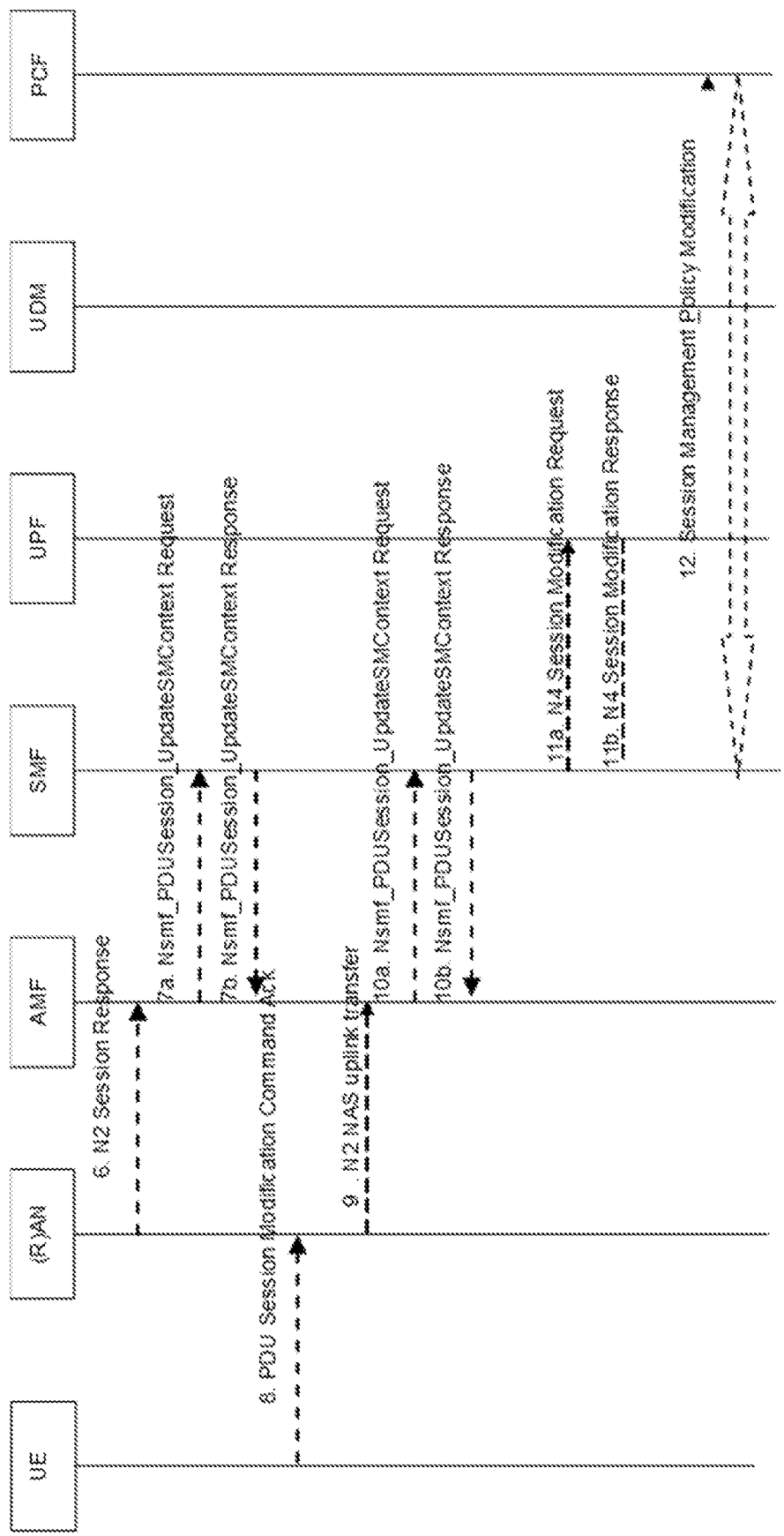
Figure 4:
FIG. 4 illustrates existing priority levels, which go best effort when above GBR.

Certain embodiments may include functionality for providing scheduling prioritization behavior when traffic bitrate is above Guaranteed Flow Bit Rate (GFBR)/Guaranteed Bit Rate (GBR) but below Maximum Flow Bit Rate (MFBR)/Maximum Bit Rate (MBR) to provide a "expected quality bitrate." Thus, it is proposed to extend the 3GPP Quality of Service (QoS) framework with additional (optional and proprietary) scheduling priority behavior between the two thresholds, GBR (or GFBR) and MBR (or MFBR). As discussed above, FIG. 1 depicts QoS Threshold boundaries. The priority level should not fall flat to zero once the media bitrate is above GBR/GFBR bitrate. Instead, the scheduling priority level should decrease gradually with increasing bitrate. Stated differently, the level of prioritization of QoS flow decreases with increasing media bit rate. As such, according to certain embodiments, for example, the scheduling priority decreases according to a formula from the scheduling priority at GFBR/GBR down to zero, when traffic bitrate reaches MFBR/MBR. As result, the traffic within the QoS bearer would still be treated better than best effort, when the media bitrate is above GBR/GFBR.

According to certain embodiments, the QoS framework may be extended with additional signaling to describe the scheduling behavior above GBR or via preconfigured behavior in the Radio Access Network (RAN) associated to the QoS characteristics of a flow/bearer. For example, new parameters may be signaled so that RAN scheduler nodes become aware about the scheduling behavior between GFBR/GBR and MFBR/MBR. Though scheduling priority is described as one input parameter to be provided to the RAN scheduler node, other input parameters such as, for example, target bit rate may additionally or alternatively be provided to the RAN scheduler node to improve end user quality of experience. In an LTE network, the RAN scheduler node may include an eNodeB (eNB).

Figure 5:
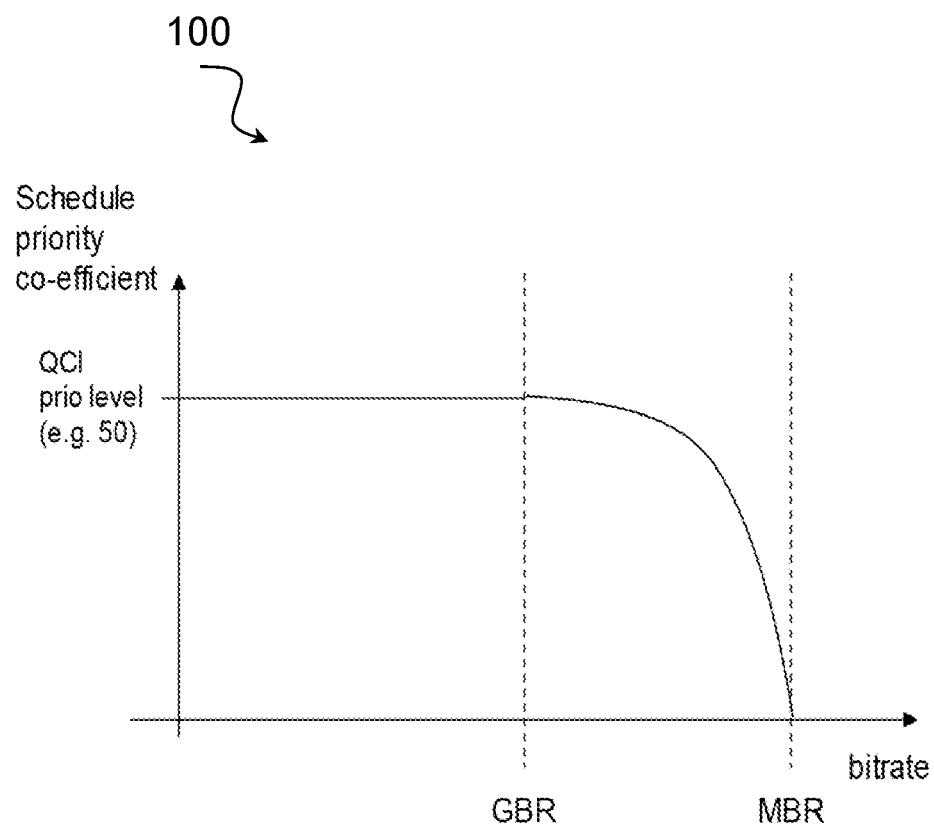
FIG. 5 illustrates an example graph depicting a preferred scheduling priority level, according to certain embodiments.

Particular embodiments are described in FIGS. 5-24 of the drawings, like numerals being used for like and corresponding parts of the various drawings. Specifically, FIG. 5 illustrates an example graph 100 depicting a preferred scheduling priority level, according to certain embodiments. The eNB scheduler, which may also be referred to as a RAN scheduler, derives the current scheduling priority of a UE or flow based on various input parameters and includes a variable scheduling priority coefficient or weight. As depicted, the scheduling priority level exponentially decreases with traffic bitrate increase. Consequently, the video application is able to get above GBR and the scheduler will prioritize the traffic higher (i.e. try harder), when the bitrate is just above GBR.

Figure 6:
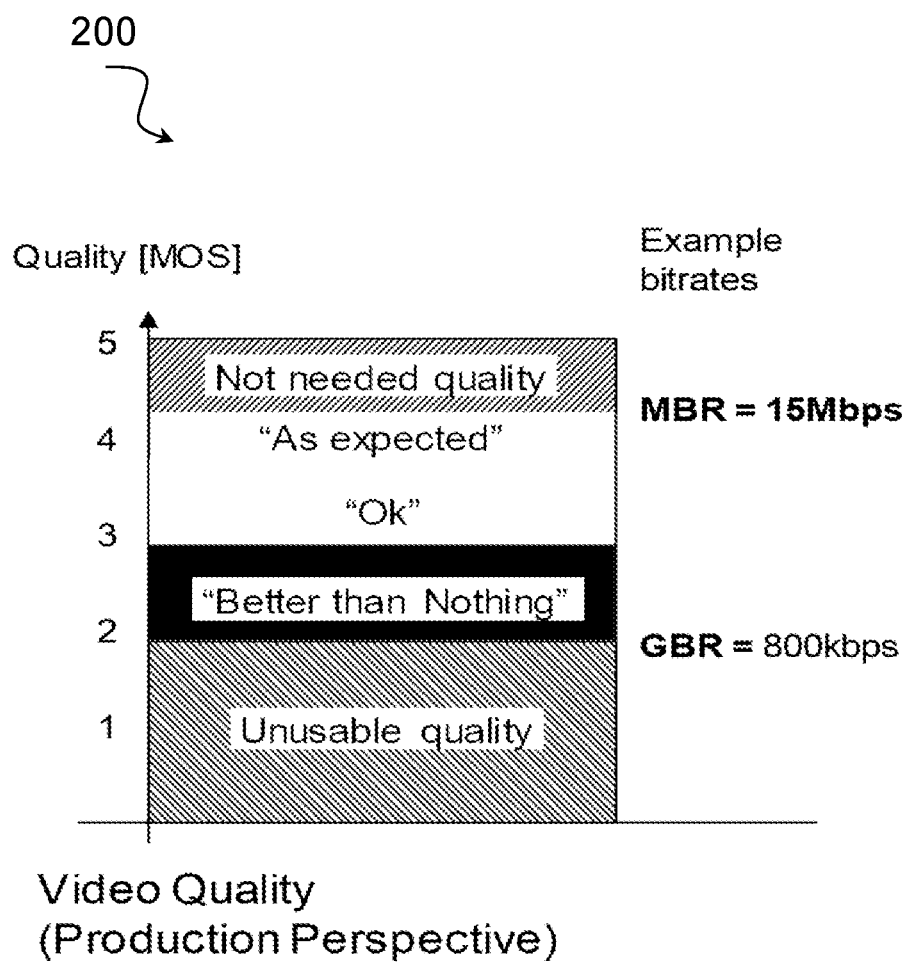
FIG. 6 illustrates an example graph demonstrating the resulting usage of the 3GPP Quality of Service (QoS) Framework, according to certain embodiments.

FIG. 6 illustrates an example graph 200 demonstrating the resulting usage of the 3GPP QoS Framework, according to certain embodiments. Specifically, FIG. 6 illustrates QoS threshold boundaries. The GBR is considered as the lowest acceptable bitrate threshold.

The lowest acceptable bitrate is selected as GBR value, since the system admission control is rejecting/pre-empting QoS bearers based on the GBR value. Thus, when the GBR value for the QoS bearer is set too high, the system may tear-down the QoS bearer, although the resulting video quality might still be usable.

So, the GBR is set as the lowest quality that the service is surviving at, and as the bit rate used for admitting the service/QoS flow and the bit rate used for pre-empting other services/QoS flows having a lower ARP.

The wanted service expected quality level is higher than the GBR and the system needs to determine the importance of getting a better service quality using the proposed dynamic scheduling priority and target bit rate. But, admission and pre-emption cannot be made based on the higher wanted service target quality.

The video application layer may terminate the delivery of the data, when the bitrate (and the resulting quality) falls below the low threshold, i.e. the GBR threshold. The preferred service operation point is close to the MBR, which may be referred to as a target bitrate (TBR), and adapted to the load in the network as well as the rate adaptation capability of the video flow.

The target bitrate may be lower or equal from the MBR. Note, in some deployment, the system is dropping packets, when the MBR is reached. Therefore, it may be desired to set the target bitrate for the service lower than the MBR.

Figure 7:
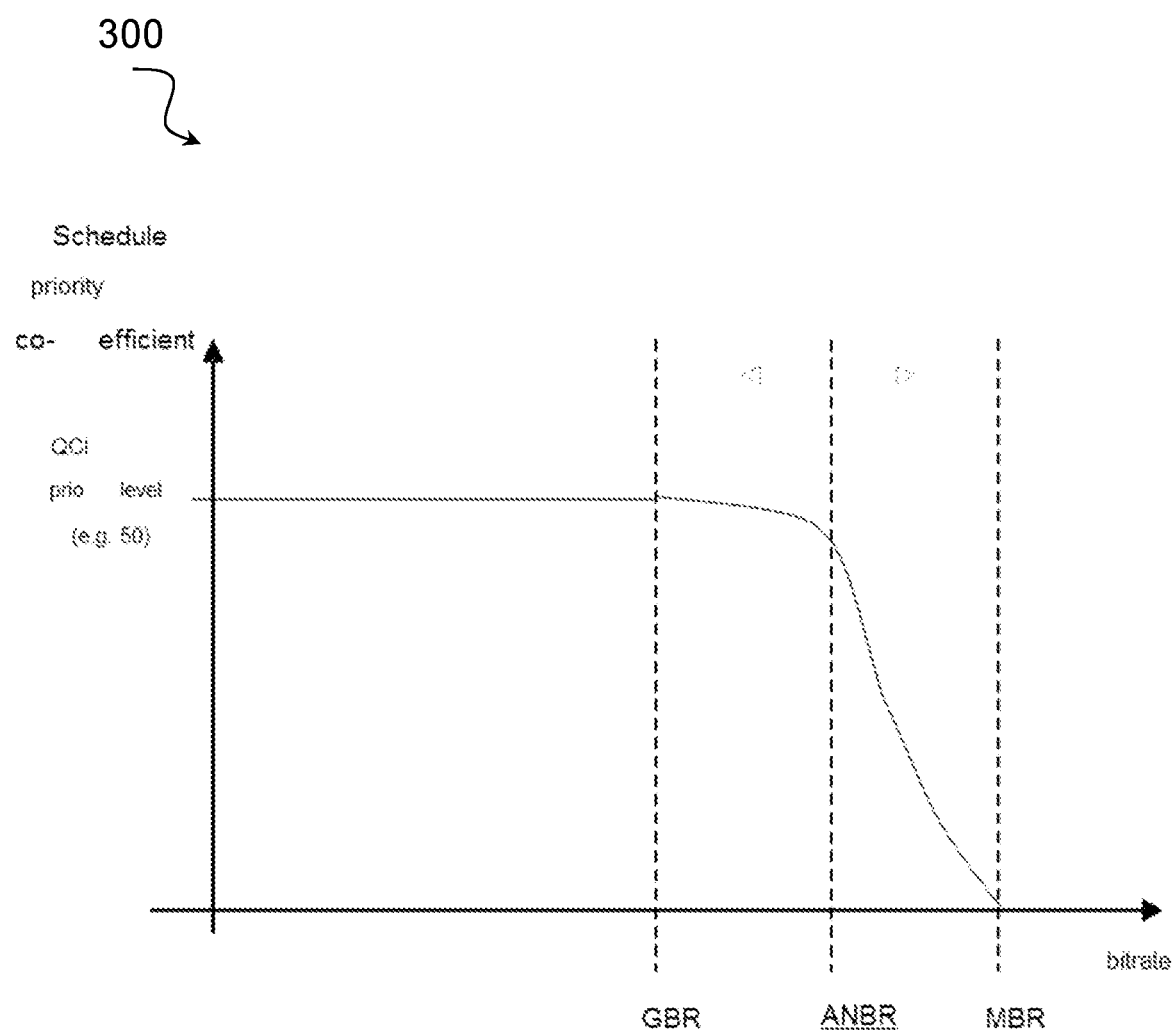
FIG. 7 illustrates an example graph demonstrating priority with bitrate recommendations that include the added Access Network Bitrate Recommendation (ANBR), according to certain embodiments.

While MBR is typically set to a static value for an entire session or for a certain application, it can in some cases be possible for the access network to provide the client with dynamic, short-term information about what sustainable bitrate (below MBR) that is currently feasible to use (i.e. a bit rate below that MBR and the target bitrate, which can be sustained by the system for some (short) time). Such dynamically varying bitrate, labeled as Access Network Bitrate Recommendation (ANBR) in the figure, can be considered in the scheduling priority. FIG. 7 illustrates an example graph 300 demonstrating priority with bitrate recommendations that include the added ANBR, according to certain embodiments. As depicted, priority decreases above the time-varying ANBR but still not reach zero until bitrate reaches MBR. It may be noted that ANBR is merely an estimate of what bit rate the RAN can provide during the next coming period and is not a commitment to the wireless device. 3GPP systems offer different radio access systems. Some radio access systems are capable (depending on the deployment) to provide higher uplink data rates than others. For example, when a device is connected via the new NR radio access network, much higher data rates will be possible than using existing HSPA or GERAN radio access networks.

Figure 8:
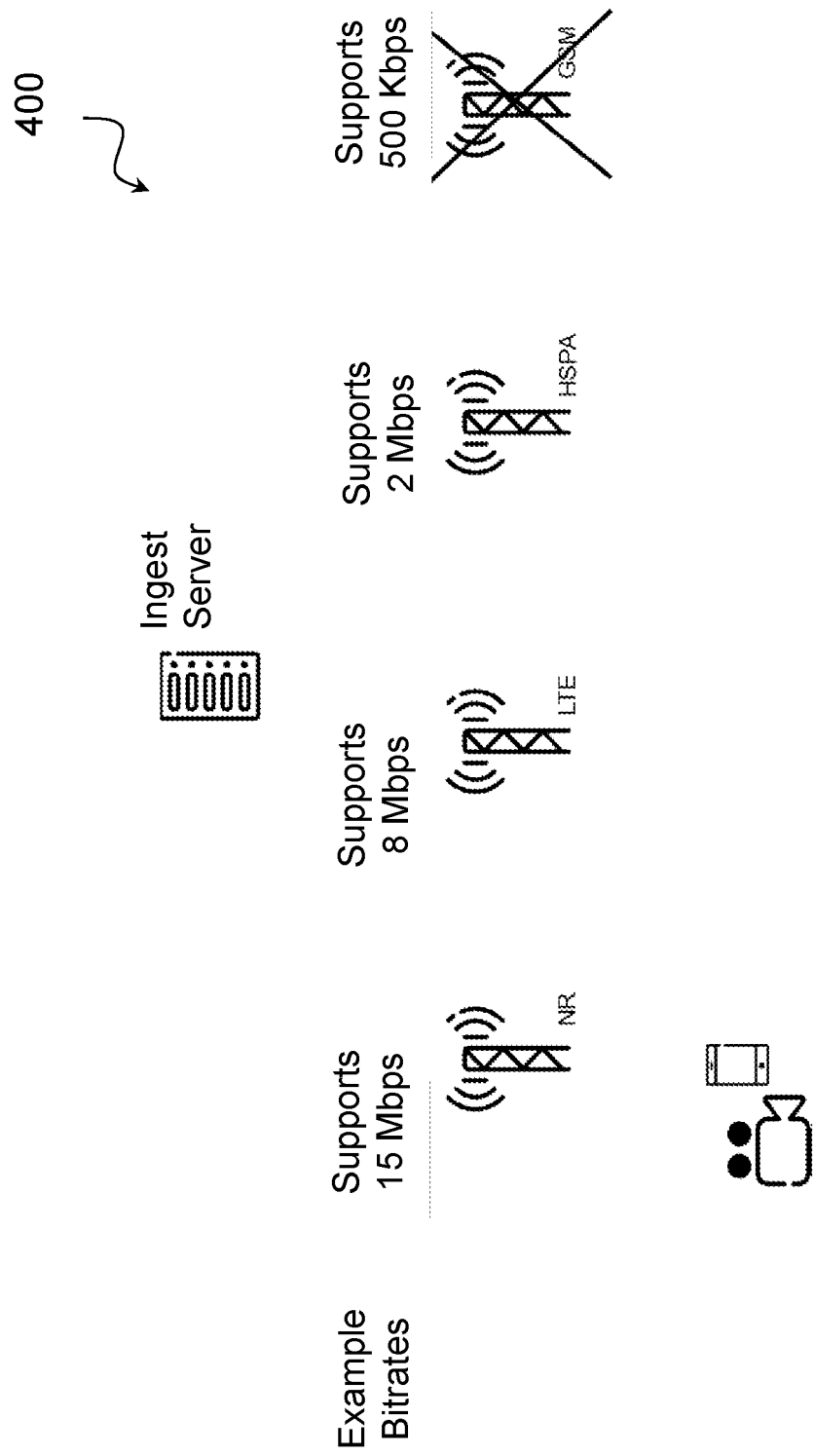
FIG. 8 illustrates an example access network with access network-specific maximal sustainable bit rates, according to certain embodiments.

FIG. 8 illustrates an example access network 400 with access network-specific maximal sustainable bit rates, according to certain embodiments. Specifically, FIG. 8 depicts a mobility case, where a mobile uplink streaming client is either getting active in different radio access systems (nomadic mobility) or even moving between access systems with an active uplink streaming session. The different access networks have different bitrate characteristics (of course, deployment release and carrier bandwidth will have similar effects).

As consequence, there may be handovers within one radio access network (e.g. within NR) or even between radio access networks (e.g. from NR to HSPA).

Due to inter RAT hand-over, the GBR should not be set to a too high bitrate. The UE may handover to a RAT, which does not support such high bitrate and the admission control may reject a QoS bearer. A GBR value should be found, which refers to the bare minimal acceptable bitrate so that each RAT keep the QoS bearer and the application adapts the bitrate to the admitted parameters.

Beside the mobile media production use-case, there are several other use-cases. The devices may be stationary (e.g. stationary media production or mounted surveillance camera's) and some other may be mobile (e.g. patterns of "breaking news" reporters or vehicle mounted surveillance cameras).

3GPP QoS framework specifies a Guaranteed (Flow) Bitrate (G(F)BR), a Maximum (Flow) Bitrate (M(F)BR), an Allocation and Retention Priority (ARP), and additional QoS Class Indicators (QCI/5QI). Each QCI defines a priority level (PL), a maximal latency and a maximal packet loss rate for the QoS flow.

In 3GPP systems, QoS bearers are requested via the PCF/PCRF. Typically network nodes interact with the PCF/PCRF for QoS.

Figure 9:
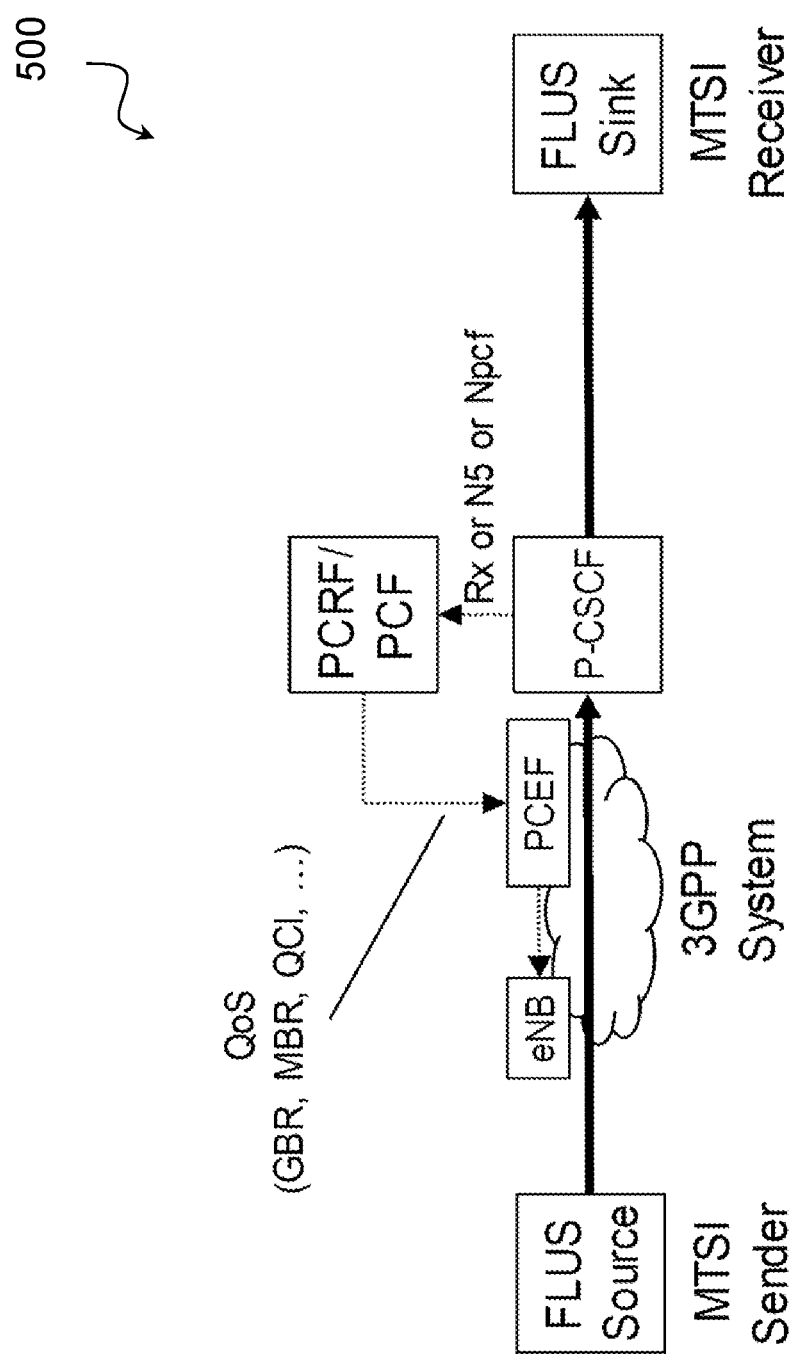
FIG. 9 illustrates an example IP Multimedia Subsystem (IMS)/Multimedia Telephony Service (MTSI) based architecture, according to certain embodiments.

FIG. 9 illustrates an example IP Multimedia Subsystem (IMS)/Multimedia Telephony Service (MTSI) based architecture 500, according to certain embodiments. The Proxy-Call Session Control Function (P-CSCF) forwards the Session Initiation Protocol (SIP) INVITE (call setup message) via potentially other IMS nodes to the Framework for Live Uplink Streaming (FLUS) Sink. The P-CSCF extracts QoS information such as bitrate from the SIP INVITE message and triggers the establishment of a QoS bearer/QoS flow via the Policy Control Function (PCF). The 5-Tuple(s) for the (uplink) UDP sessions are forwarded as well.

Figure 10:
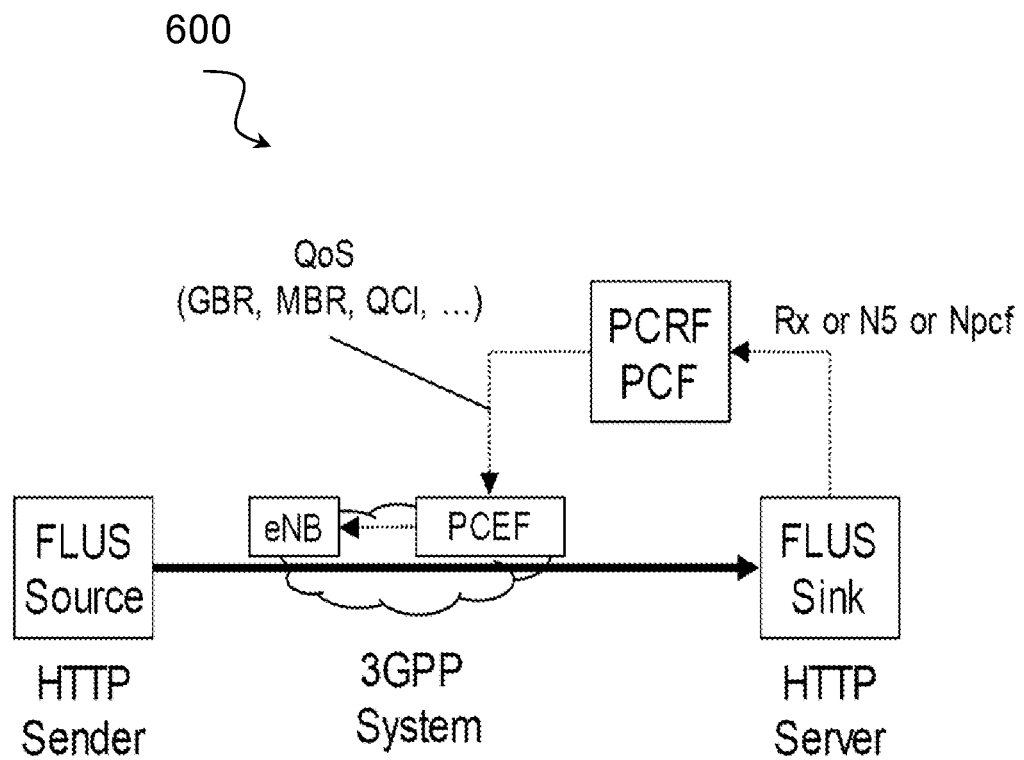
FIG. 10 illustrates how in 5GS the requested differentiation to be provided through the QoS parameters of a QoS flow are signaled, according to certain embodiments.

FIG. 10 illustrates an example Hyper Text Transport Protocol (HTTP) based architecture 600, according to certain embodiments. Here, the FLUS Sink, which may also be known as the HTTP Server, interacts with the PCF to trigger the establishment of a QoS bearer/QoS flow. The FLUS Sink derives the QoS parameters from earlier provisioning steps or from the initialization information of the HTTP FLUS session (i.e. from the Bitrate ('btrt') box in the codec configuration box such as 'avcC' for H.264. ISO-BMFF boxes are defined in ISO/IEC 14496-12).

According to certain embodiments, however, the RAN scheduler combines multiple input parameters into its scheduling decision: The RAN scheduler determines the current bitrate of a traffic flow in a time window by summing up the traffic volume (in bits or bytes) and divides the traffic volume by the measurement window. The RAN scheduler applies the scheduling priority (co-efficient) for flows, which are above GBR, but below MBR. The RAN scheduler is considering the current channel condition to that device and also the maximal delay of packets. Packets, which are close to the due date (max delay) get a higher priority than packets, which have just arrived at the RAN scheduler.

According to certain embodiments, the UE may not be able to predict its mobility pattern, so, the lowest acceptable quality should be set as GBR so that at least the minimum quality is provided. FIG. 6 depicts the GBR (or GFBR) and MBR values. The GBR is the "minimum acceptable bitrate", while the MBR is set to the "Not higher bitrate needed" threshold.

According to certain embodiments, the eNB scheduler receives the information through explicit signaling. For example, a new signaled information element may be defined, which may carry the formula or a label for a formula. According to a particular embodiment the formula may include a priority level over current flow bitrate.

According to certain other embodiments, the eNB scheduler may implicitly derive the information from QoS parameters and specifically from the QCI/5QI). As another example, the eNB scheduler may implicitly derive the information from the Access and Retention Priority (ARP).

Figure 11:
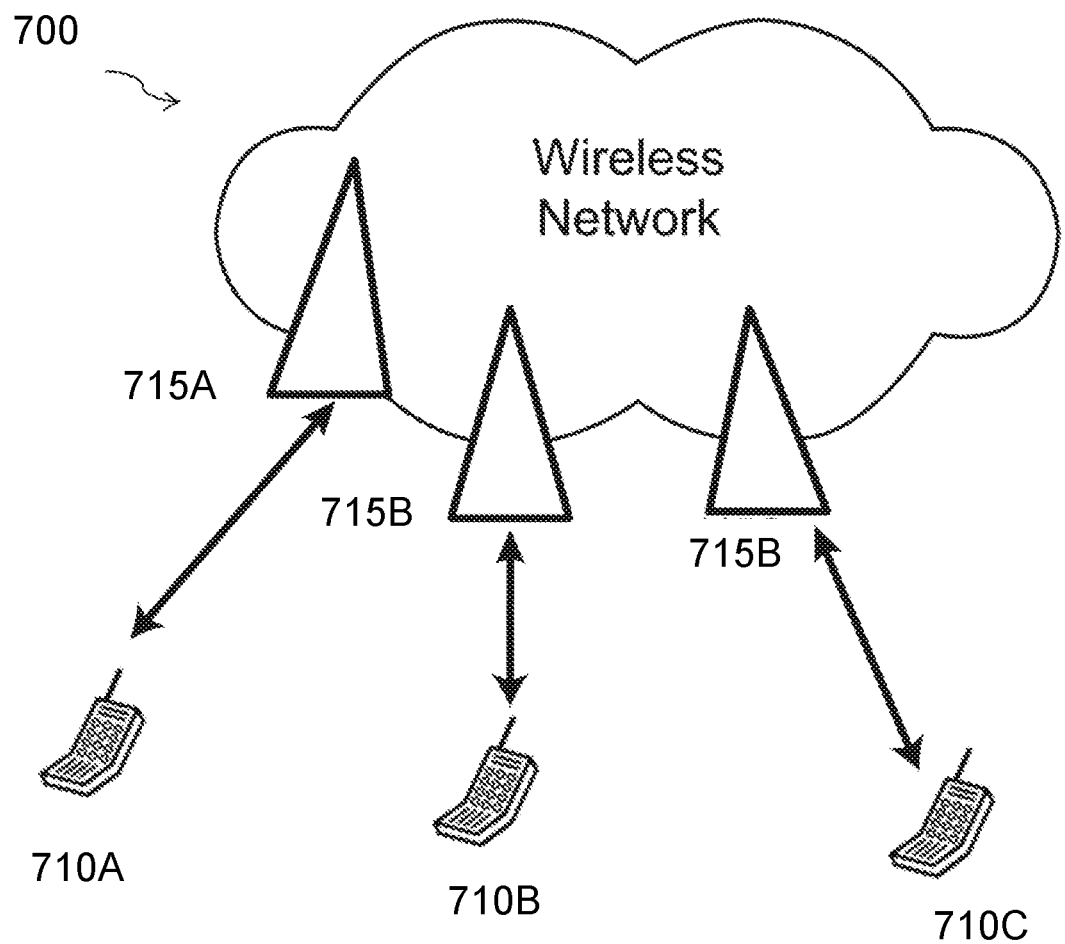
FIG. 11 illustrates an example network for dynamic scheduling prioritization for live uplink streaming, according to certain embodiments.

FIG. 11 is a block diagram illustrating an embodiment of a network 700 for dynamic scheduling prioritization for live uplink streaming, in accordance with certain embodiments. Network 700 includes one or more wireless devices 710A-C, which may be interchangeably referred to as wireless devices 710 or UEs 710, and network nodes 715A-C, which may be interchangeably referred to as network nodes 715 or eNodeBs 715. A wireless device 710 may communicate with network nodes 715 over a wireless interface. For example, wireless device 710A may transmit wireless signals to one or more of network nodes 715, and/or receive wireless signals from one or more of network nodes 715. The wireless signals may contain voice traffic, data traffic, control signals, and/or any other suitable information. In some embodiments, an area of wireless signal coverage associated with a network node 715 may be referred to as a cell. In some embodiments, wireless devices 710 may have D2D capability. Thus, wireless devices 710 may be able to receive signals from and/or transmit signals directly to another wireless device 710. For example, wireless device 710A may be able to receive signals from and/or transmit signals to wireless device 710B.

In certain embodiments, network nodes 715 may interface with a radio network controller (not depicted in FIG. 11). The radio network controller may control network nodes 715 and may provide certain radio resource management functions, mobility management functions, and/or other suitable functions. In certain embodiments, the functions of the radio network controller may be included in network node 715. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 710. Wireless devices 710 may exchange certain signals with the core network node using the non-access stratum layer. In non-access stratum signaling, signals between wireless devices 710 and the core network node may be transparently passed through the radio access network. In certain embodiments, network nodes 715 may interface with one or more network nodes over an internode interface. For example, network nodes 715A and 715B may interface over an X2 interface.

As described above, example embodiments of network 700 may include one or more wireless devices 710, and one or more different types of network nodes capable of communicating (directly or indirectly) with wireless devices 710. Wireless device 710 may refer to any type of wireless device communicating with a node and/or with another wireless device in a cellular or mobile communication system. Examples of wireless device 710 include a mobile phone, a smart phone, a personal data assistant (PDA), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 710 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, gNodeB, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, or any suitable network node. Example embodiments of wireless devices 710, network nodes 715, and other network nodes (such as radio network controller or core network node) are described in more detail with respect to FIGS. 12, 13, and 22, respectively.

Although FIG. 11 illustrates a particular arrangement of network 700, the present disclosure contemplates that the various embodiments described herein may be applied to a variety of networks having any suitable configuration. For example, network 700 may include any suitable number of wireless devices 710 and network nodes 715, as well as any additional elements suitable to support communication between wireless devices or between a wireless device and another communication device (such as a landline telephone). Furthermore, although certain embodiments may be described as implemented in a long term evolution (LTE) network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to 5G NR, LTE, LTE-Advanced, LTE-U UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink and vice versa.

The techniques for providing scheduling prioritization behavior when traffic bitrate is above GFBR/GBR but below MFBR/MBR to provide a target quality bitrate described herein are applicable to both LAA LTE and standalone LTE operation in license-exempt channels. The described techniques are generally applicable for transmissions from both network nodes 715 and wireless devices 710.

Figure 12:
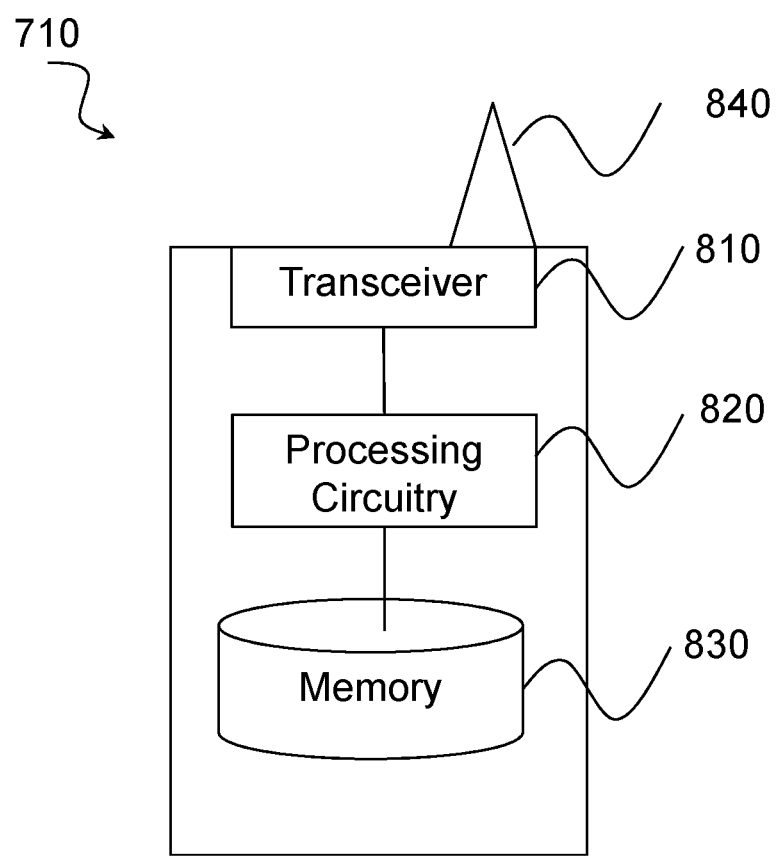
FIG. 12 illustrates an example wireless device for dynamic scheduling prioritization for live uplink streaming, according to certain embodiments.

FIG. 12 is a block schematic of an exemplary wireless device 710 for dynamic scheduling prioritization for live uplink streaming, in accordance with certain embodiments. Wireless device 710 may refer to any type of wireless device communicating with a node and/or with another wireless device in a cellular or mobile communication system. Examples of wireless device 710 include a mobile phone, a smart phone, a Personal Digital Assistant (PDA), a portable computer (e.g., laptop, tablet), a sensor, a modem, an MTC device/machine-to-machine (M2M) device, laptop embedded equipment (LEE), laptop mounted equipment (LME), USB dongles, a D2D capable device, or another device that can provide wireless communication. A wireless device 710 may also be referred to as UE, a station (STA), a device, or a terminal in some embodiments. Wireless device 710 includes transceiver 810, processing circuitry 820, and memory 830. In some embodiments, transceiver 810 facilitates transmitting wireless signals to and receiving wireless signals from network node 715 (e.g., via antenna 840), processing circuitry 820 (e.g., which may include one or more processors) executes instructions to provide some or all of the functionality described above as being provided by wireless device 710, and memory 830 stores the instructions executed by processing circuitry 820.

Processing circuitry 820 may include any suitable combination of hardware and software implemented in one or more modules to execute instructions and manipulate data to perform some or all of the described functions of wireless device 710, such as the functions of UE 710 (i.e., wireless device 710) described herein. In some embodiments, processing circuitry 820 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 820.

Other embodiments of wireless device 710 may optionally include additional components beyond those shown in FIG. 12 that may be responsible for providing certain aspects of the wireless device's functionality, including any of the functionality described above and/or any additional functionality (including any functionality necessary to support the solution described above). As just one example, wireless device 710 may include input devices and circuits, output devices, and one or more synchronization units or circuits, which may be part of the processing circuitry 820. Input devices include mechanisms for entry of data into wireless device 710. For example, input devices may include input mechanisms, such as a microphone, input elements, a display, etc. Output devices may include mechanisms for outputting data in audio, video, and/or hard copy format. For example, output devices may include a speaker, a display, etc.

Figure 13:
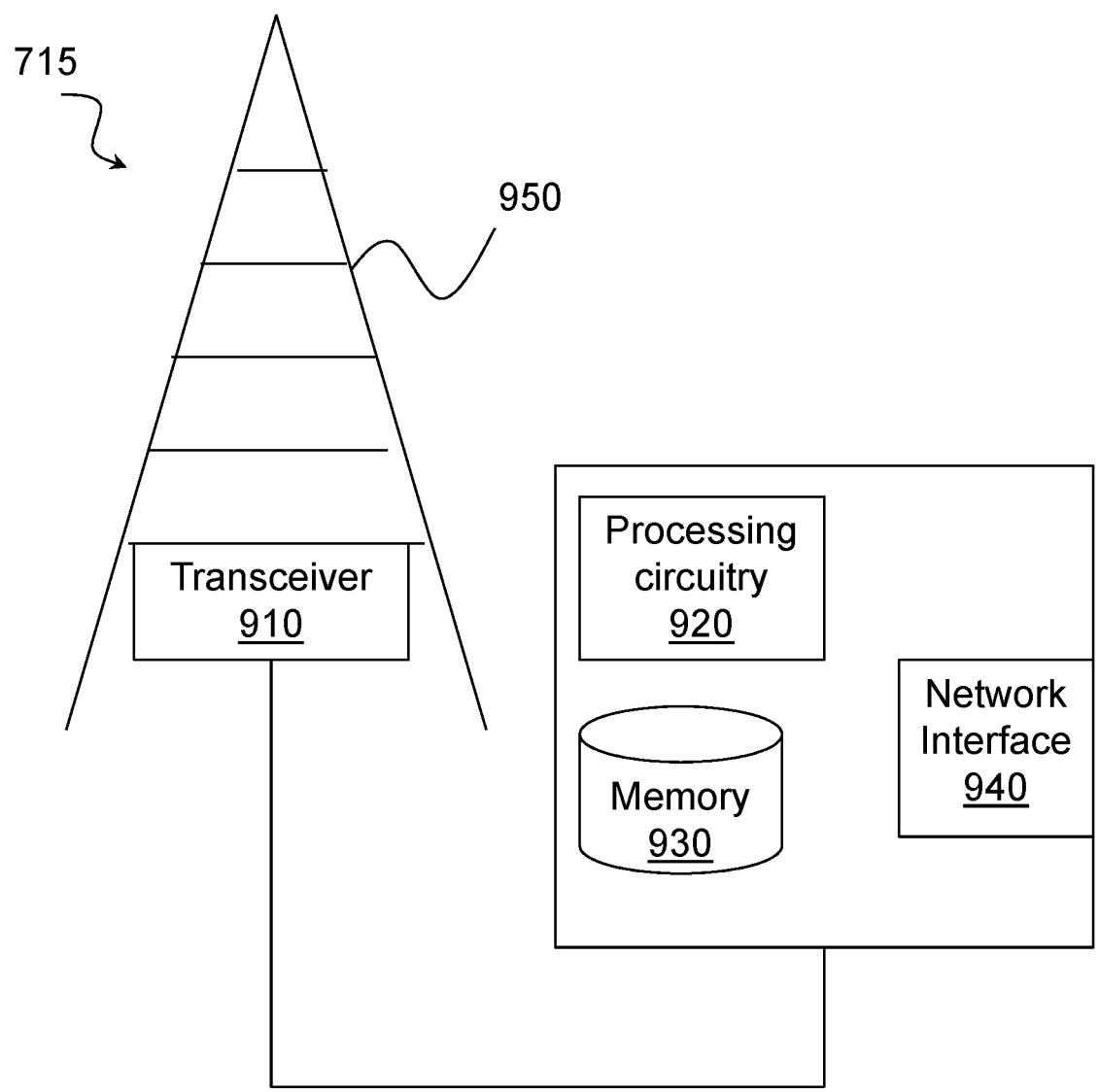
FIG. 13 illustrate an example network node for dynamic scheduling prioritization for live uplink streaming, according to certain embodiments.

FIG. 13 illustrates an example network node 715 for dynamic scheduling prioritization for live uplink streaming, in accordance with certain embodiments. Network node 715 may be any type of radio network node or any network node that communicates with a UE and/or with another network node. Examples of network node 715 include an gNB, eNodeB, a node B, a base station, a wireless access point (e.g., a Wi-Fi access point), a low power node, a base transceiver station (BTS), relay, donor node controlling relay, transmission points, transmission nodes, remote radio unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 715 may be deployed throughout network 700 as a homogenous deployment, heterogeneous deployment, or mixed deployment. A homogeneous deployment may generally describe a deployment made up of the same (or similar) type of network nodes 715 and/or similar coverage and cell sizes and inter-site distances. A heterogeneous deployment may generally describe deployments using a variety of types of network nodes 715 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 715 may include one or more of transceiver 910, processing circuitry 920 (e.g., which may include one or more processors), memory 930, and network interface 940. In some embodiments, transceiver 910 facilitates transmitting wireless signals to and receiving wireless signals from wireless device 710 (e.g., via antenna 950), processing circuitry 920 executes instructions to provide some or all of the functionality described above as being provided by a network node 715, memory 930 stores the instructions executed by processing circuitry 920, and network interface 940 communicates signals to backend network components, such as a gateway, switch, router, Internet, Public Switched Telephone Network (PSTN), core network nodes or radio network controllers, etc.

Processing circuitry 920 may include any suitable combination of hardware and software implemented in one or more modules to execute instructions and manipulate data to perform some or all of the described functions of network node 715, such as those described herein. In some embodiments, processing circuitry 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processing circuitry 920 and may refer to any suitable device operable to receive input for network node 715, send output from network node 715, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

Other embodiments of network node 715 may include additional components beyond those shown in FIG. 13 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 14:
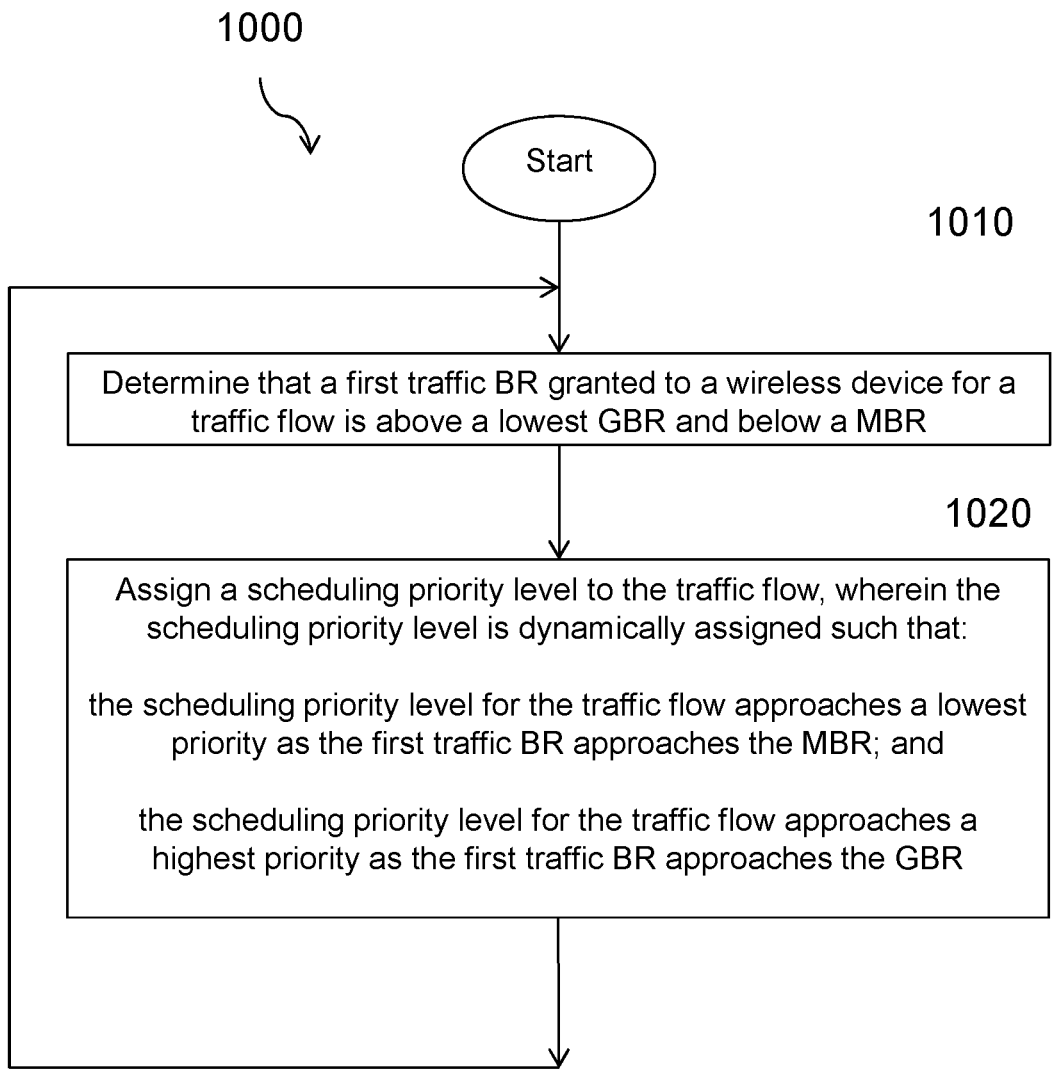
FIG. 14 illustrates an example method by a network node operating as a RAN scheduler for dynamic scheduling prioritization for live uplink streaming, according to certain embodiments.

FIG. 14 illustrates an example method 1000 by a network node 715 operating as a RAN scheduler for dynamic scheduling prioritization for live uplink streaming. Although the methods and techniques described herein are described as being applicable to the uplink direction and for uplink streaming, the methods and techniques described herein can equally be applicable in the downlink direction and for other services.

The method begins at step 1010 when network node 715 determines that a first traffic BR granted to a wireless device 710 for a traffic flow is above a lowest GBR and below a MBR.

At step 1020, network node 715 assigns a scheduling priority level to the traffic flow, wherein the scheduling priority level is dynamically assigned such that:
  the scheduling priority level for the traffic flow approaches a lowest priority as the first traffic BR approaches the MBR; and
  the scheduling priority level for the traffic flow approaches a highest priority as the first traffic BR approaches the GBR.
According to the various embodiments, the variation in the scheduling priority between the lowest priority as the first traffic BR approaches the MBR and the highest priority as the first traffic BR approaches the GBR may be linear or non-linear.

According to a particular embodiment, network node 715 may also assign one or more resources to the traffic flow based on the dynamically assigned scheduling priority level and transmit, to wireless device 710, an uplink grant identifying the one or more resources assigned to the first traffic flow.

According to a particular embodiment, the scheduling priority level may be dynamically assigned based on a target bit rate for the traffic flow, the target bit rate being greater than the GBR and less than the MBR. Network node 715 may select an Access Network Bitrate Recommendation (ANBR) based on the access network conditions and type. For example, in a particular embodiment, ANBR may be selected based on a bit rate below the MBR that is currently feasible. Network node 715 may then transmit the ANBR to wireless device 710, a bit rate below the MBR that is currently feasible. Like the target bit rate, the ANBR may be greater than the GBR and less than the MBR. In a particular embodiment, network node 715 may also transmit an indication of a duration of time during which wireless device 710 is to use the ANBR.

According to certain embodiments, the method may repeat and/or be performed in a loop such that the network node 715 adjusts the scheduling priority level for each uplink grant based on the traffic BR of the traffic flow associated with the previous uplink grant. For example, network node 715 may receive data associated with the uplink grant from the wireless device and return to step 1010 to determine a second traffic BR of the data within the traffic flow. Network node may again determine that the second traffic BR associated with the uplink grant is above a lowest GBR and below a MBR and adjust the scheduling priority level assigned to the traffic flow, at step 1020, such that the adjusted scheduling priority level for the traffic flow approaches the lowest priority as the second traffic BR approaches the MBR and the adjusted scheduling priority level for the traffic flow approaches the highest priority as the second traffic BR approaches the GBR.

Certain embodiments may comprise more or fewer actions, and the actions may be performed in any suitable order.

Figure 15:
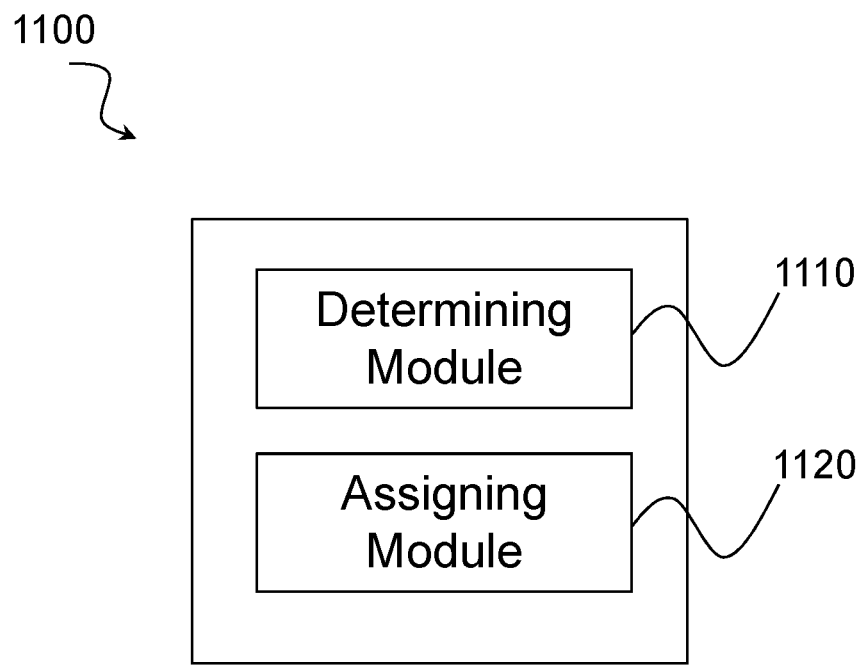
FIG. 15 illustrates an example virtual computing device for dynamic scheduling prioritization for live uplink streaming, according to certain embodiments.

In certain embodiments, the method for dynamic scheduling prioritization for live uplink streaming may be performed by a virtual computing device. FIG. 15 illustrates an example virtual computing device 1100 for dynamic scheduling prioritization for live uplink streaming, according to certain embodiments. In certain embodiments, virtual computing device 1100 may include modules for performing steps similar to those described above with regard to the method illustrated and described in FIG. 14. For example, virtual computing device 1100 may include a determining module 1110, an assigning module 1120, and any other suitable modules for providing scheduling prioritization for live uplink streaming. In some embodiments, one or more of the modules may be implemented using processing circuitry 920 of FIG. 13. In certain embodiments, the functions of two or more of the various modules may be combined into a single module.

The determining module 1110 may perform certain of the determining functions of virtual computing device 1100. For example, in a particular embodiment, determining module 1110 may determine that a first traffic BR granted to a wireless device 710 for a traffic flow is above a lowest GBR and below a MBR.

The assigning module 1120 may perform certain of the assigning functions of virtual computing device 1100. For example, in a particular embodiment, assigning module 1120 may assign a scheduling priority level to the traffic flow. The scheduling priority level may be dynamically assigned such that the scheduling priority level for the traffic flow approaches a lowest priority as the first traffic BR approaches the MBR and a highest priority as the first traffic BR approaches the GBR.

Other embodiments of virtual computing device 1100 may include additional components beyond those shown in FIG. 15 that may be responsible for providing certain aspects of the network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 16:
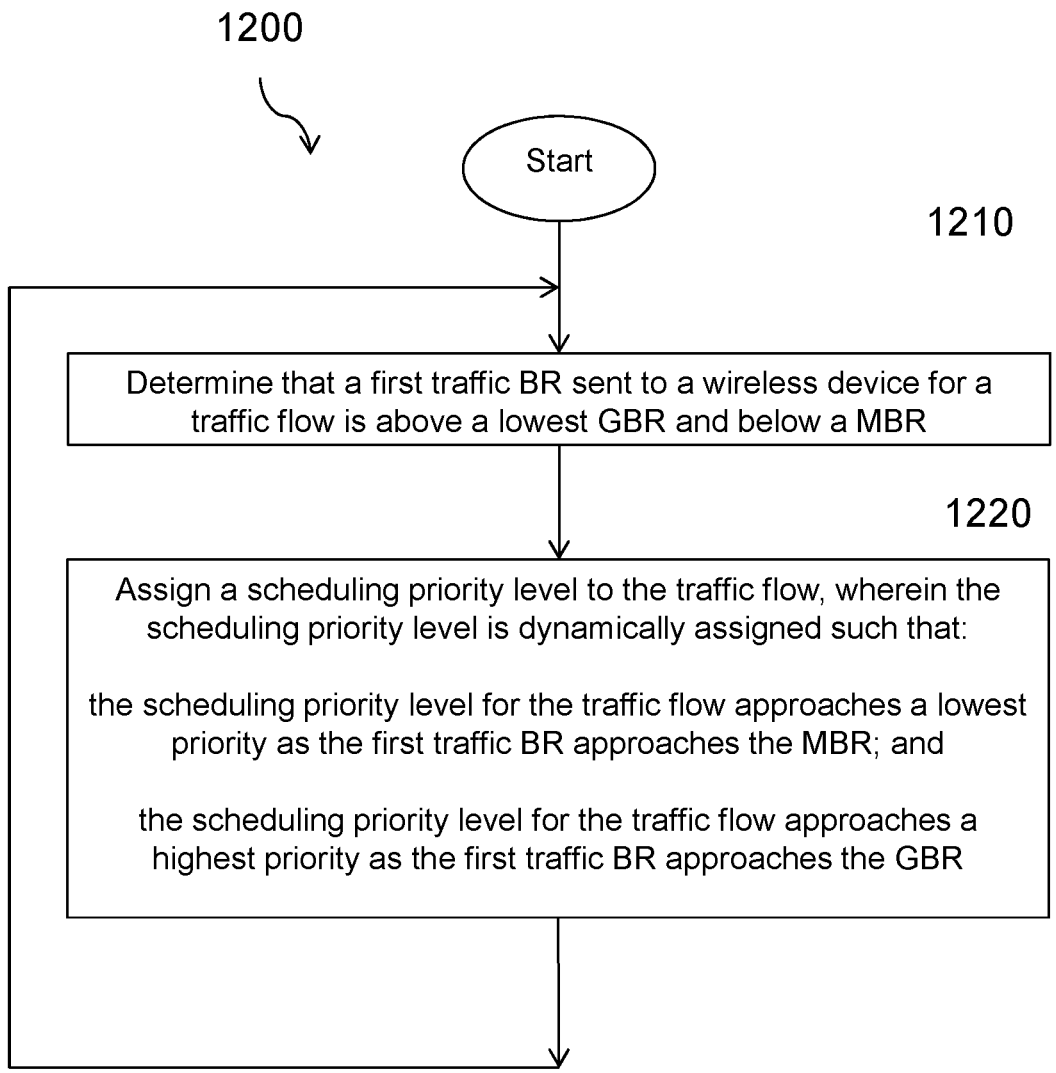
FIG. 16 illustrates an example method by a network node operating as a RAN scheduler for dynamic scheduling prioritization for live downlink streaming, according to certain embodiments.

FIG. 16 illustrates an example method 1200 by a network node 715 operating as a RAN scheduler for dynamic scheduling prioritization for live downlink streaming. Although the methods and techniques described herein are described as being applicable to the uplink direction and for uplink streaming, the methods and techniques described herein can equally be applicable in the downlink direction and for other services.

The method begins at step 1210 when network node 715 determines that a first traffic BR sent to a wireless device 710 for a traffic flow is above a lowest GBR and below a MBR.

At step 1220, network node 715 assigns a scheduling priority level to the traffic flow, wherein the scheduling priority level is dynamically assigned such that:
  the scheduling priority level for the traffic flow approaches a lowest priority as the first traffic BR approaches the MBR; and
  the scheduling priority level for the traffic flow approaches a highest priority as the first traffic BR approaches the GBR.

According to the various embodiments, the variation in the scheduling priority between the lowest priority as the first traffic BR approaches the MBR and the highest priority as the first traffic BR approaches the GBR may be linear or non-linear.

According to a particular embodiment, network node 715 may also assign one or more resources to the traffic flow based on the dynamically assigned scheduling priority level.

According to a particular embodiment, the scheduling priority level may be dynamically assigned based on a target bit rate for the traffic flow, the target bit rate being greater than the GBR and less than the MBR.

According to certain embodiments, the method may repeat and/or be performed in a loop such that the network node 715 periodically adjusts the scheduling priority level for the traffic flow based on the traffic BR of previously sent data. For example, network node 715 may send data according to the assigned scheduling priority level after step 1220. The method may then return to step 1210 to determine a second traffic BR of the sent data within the traffic flow. Network node may then repeat step 1220 to determine that the second traffic BR associated with the uplink grant is above a lowest GBR and below a MBR and adjust the scheduling priority level assigned to the traffic flow such that the adjusted scheduling priority level for the traffic flow approaches the lowest priority as the second traffic BR approaches the MBR and the adjusted scheduling priority level for the traffic flow approaches the highest priority as the second traffic BR approaches the GBR. The method may repeat in this manner for the traffic flow.

Certain embodiments may comprise more or fewer actions, and the actions may be performed in any suitable order.

Figure 17:
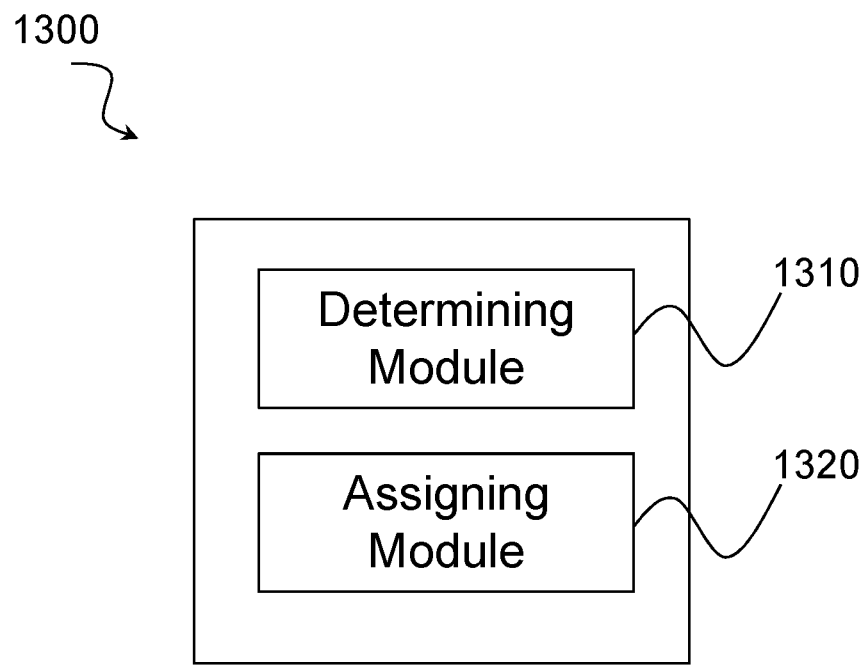
FIG. 17 illustrates an example virtual computing device for dynamic scheduling prioritization for live downlink streaming, according to certain embodiments

In certain embodiments, the method for dynamic scheduling prioritization for live downlink streaming may be performed by a virtual computing device. FIG. 17 illustrates an example virtual computing device 1300 for dynamic scheduling prioritization for live downlink streaming, according to certain embodiments. In certain embodiments, virtual computing device 1300 may include modules for performing steps similar to those described above with regard to the method illustrated and described in FIG. 16. For example, virtual computing device 1300 may include a determining module 1310, an assigning module 1320, and any other suitable modules for providing scheduling prioritization for live downlink streaming. In some embodiments, one or more of the modules may be implemented using processing circuitry 920 of FIG. 13. In certain embodiments, the functions of two or more of the various modules may be combined into a single module.

The determining module 1310 may perform certain of the determining functions of virtual computing device 1300. For example, in a particular embodiment, determining module 1310 may determine that a first traffic BR sent to a wireless device 710 for a traffic flow is above a lowest GBR and below a MBR.

The assigning module 1320 may perform certain of the assigning functions of virtual computing device 1300. For example, in a particular embodiment, assigning module 1320 may assign a scheduling priority level to the traffic flow such that the scheduling priority level for the traffic flow approaches a lowest priority as the first traffic BR approaches the MBR and a highest priority as the first traffic BR approaches the GBR.

Other embodiments of virtual computing device 1300 may include additional components beyond those shown in FIG. 17 that may be responsible for providing certain aspects of the network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 18:
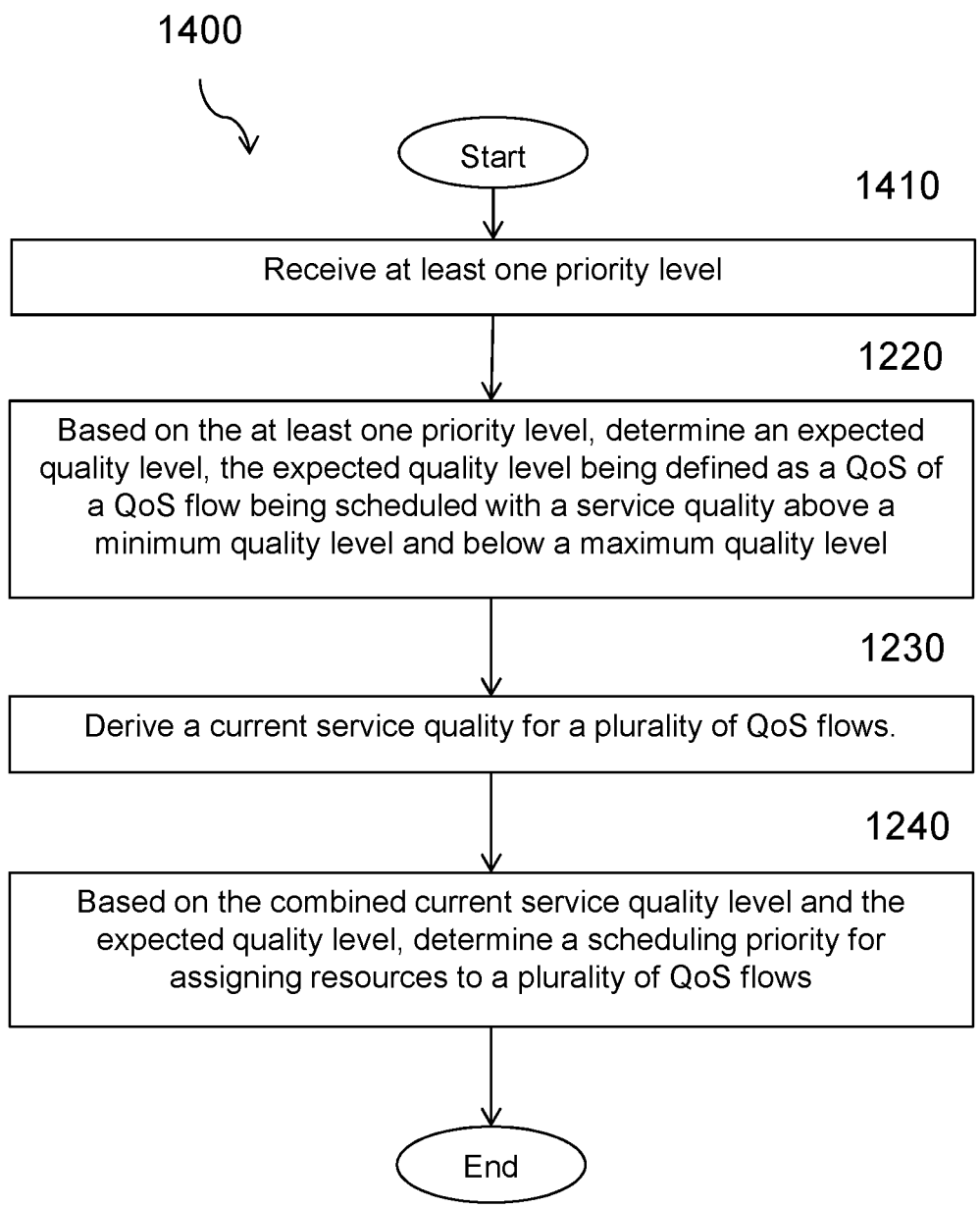
FIG. 18 illustrates an example method by a network node operating as a Radio Access Network (RAN) node for dynamic scheduling prioritization for live uplink streaming, according to certain embodiments.

FIG. 18 illustrates an example method 1400 by a network node 715 operating as a RAN scheduler for dynamic scheduling prioritization. The method begins at step 1410 when network node 715 receives at least one priority level. In a particular embodiment, the network node 715 may receive the priority level from a core network. In another embodiment, the network node 715 may be configured to obtain or derive the priority level.

Based on the at least one priority level, network node 715 determines an expected quality level, at step 1420. The expected quality level may be defined as a QoS of a QoS flow being scheduled with a service quality above a minimum quality level and below a maximum quality level.

In a particular embodiment, the at least one of the minimum quality level and the maximum quality level are derived from a QoS profile.

In a particular embodiment, the minimum quality level comprises a GBR and the maximum quality level comprises a MBR.

In a particular embodiment, the at least one scheduling priority for a first QoS flow approaches a lowest priority as a bitrate of the first QoS flow approaches a MBR. Additionally, the at least one scheduling priority for the first QoS flow approaches a highest priority as the bitrate of the first QoS flow approaches a GBR.

In a further particular embodiment, the network node 715 may transmit, to a wireless device 710, an ANBR that is greater than the GBR and less than the MBR. The ANBR may be selected based on a bit rate below the MBR that is currently feasible based on the at least one scheduling priority. Stated differently, the bit rate in the ANBR is an estimate of what bit rate the RAN will provide in a coining period. If the scheduling priority is high the bit rate will be closer to MBR. Conversely, if the scheduling priority is low, the bit rate will be closer to GBR. Thus, the ANBR depends on how scheduling priority is set.

Additionally, in a particular embodiment, network node 715 may transmit, to the wireless device 710, an indication of a duration of time for using the ANBR.

In a particular embodiment, the at least one scheduling priority for a first QoS flow of the plurality of QoS flows approaches a lowest priority as a bitrate of the first QoS flow approaches the MBR. Additionally, the at least one scheduling priority for the first QoS flow of the plurality of QoS flows approaches a highest priority as the bitrate of the first QoS flow approaches the GBR.

At step 1430, network node 715 derives a current service quality for a plurality of QoS flows.

Based on the combined current service quality and the expected quality level, network node 715 determines a scheduling priority for assigning resources to a plurality of QoS flows, at step 1440.

In a particular embodiment, network node 715 may transmit, to wireless device 710, an uplink grant identifying one or more resources assigned, based on the scheduling priority, to a first QoS flow of the plurality of QoS flows. In a further particular embodiment, network node 715 may receive data associated with the uplink grant from the wireless device, derive a current service quality based on the received data, and adjust the at least one scheduling priority assigned to the first QoS flow.

In a particular embodiment, network node 715 may also obtain at least one additional parameter. The at least one additional parameter may also be also used when assigning the resources to the plurality of QoS flows. In a particular embodiment, the at least one additional parameter may include at a target bit rate.

In a particular embodiment, other parameters may be additionally or alternatively used when assigning resources. For example, at least one of a current bit rate, a traffic volume, a current channel condition, and a maximum delay may be used when assigning resources.

In a particular embodiment, the at least one scheduling priority of a particular one of the plurality of QoS flows is assigned based on a target bit rate for the particular QoS flow. The target bit rate may be greater than a GBR and less than a MBR.

In a particular embodiment, the at least one scheduling priority for the first QoS flow may be given a lower priority as a bit rate of the first QoS flow increases above a target bit rate. Conversely, the at least one scheduling priority for the first QoS flow may be given a higher priority as the bit rate of the first QoS flow decreases below a target bit rate.

Certain embodiments may comprise more or fewer actions, and the actions may be performed in any suitable order.

Figure 19:
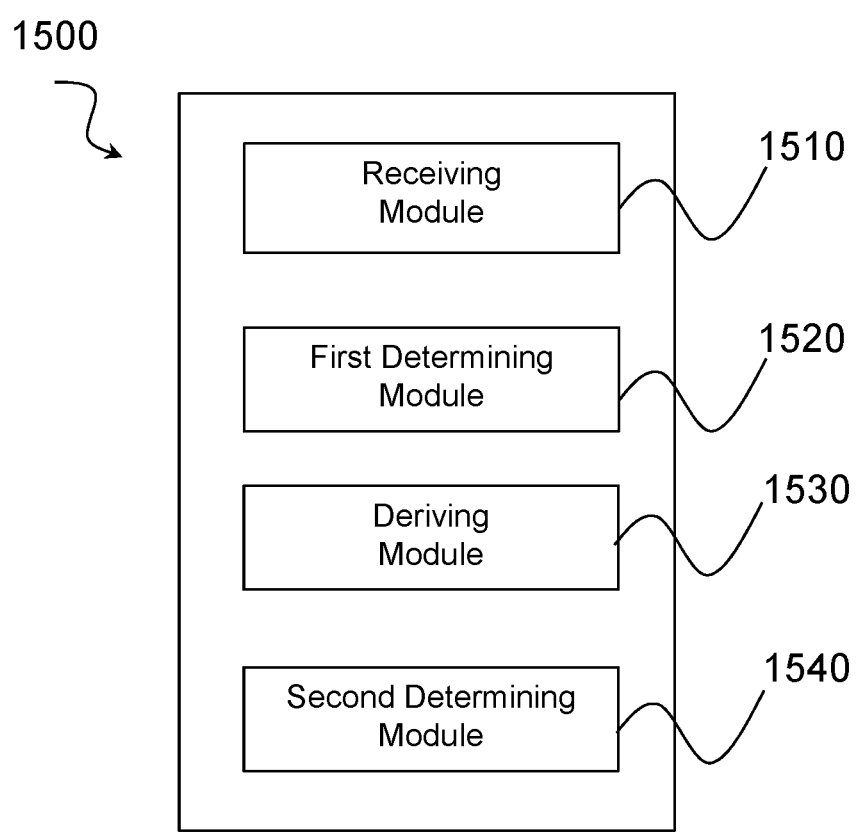
FIG. 19 illustrates an example virtual computing device for dynamic scheduling prioritization for live uplink streaming, according to certain embodiments.

In certain embodiments, the method for dynamic scheduling prioritization for live downlink streaming may be performed by a virtual computing device. FIG. 19 illustrates an example virtual computing device 1500 for dynamic scheduling prioritization for live downlink streaming, according to certain embodiments. In certain embodiments, virtual computing device 1500 may include modules for performing steps similar to those described above with regard to the method illustrated and described in FIG. 18. For example, virtual computing device 1500 may include a receiving module 1510, a first determining module 1520, a deriving module 1530, a second determining module 1540, and any other suitable modules for providing scheduling prioritization for live downlink streaming. In some embodiments, one or more of the modules may be implemented using processing circuitry 920 of FIG. 13. In certain embodiments, the functions of two or more of the various modules may be combined into a single module.

The receiving module 1510 may perform certain of the receiving functions of virtual computing device 1500. For example, in a particular embodiment, receiving module 1510 may receive at least one priority level.

The first determining module 1520 may perform certain of the determining functions of virtual computing device 1500. For example, in a particular embodiment, determining module 1520 may determine an expected quality level. The expected quality level may be defined as a QoS of a QoS flow being scheduled with a service quality above a minimum quality level and below a maximum quality level.

The deriving module 1530 may perform certain of the deriving functions of virtual computing device 1500. For example, in a particular embodiment, deriving module 1530 may derive a current service quality for a plurality of QoS flows.

The second determining module 1540 may perform certain of the determining functions of virtual computing device 1500. For example, in a particular embodiment, second determining module 1540 may determine a scheduling priority for assigning resources to a plurality of QoS flows. The scheduling priority may be based on the combined current service quality and the expected quality level.

Other embodiments of virtual computing device 1500 may include additional components beyond those shown in FIG. 19 that may be responsible for providing certain aspects of the network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 20:
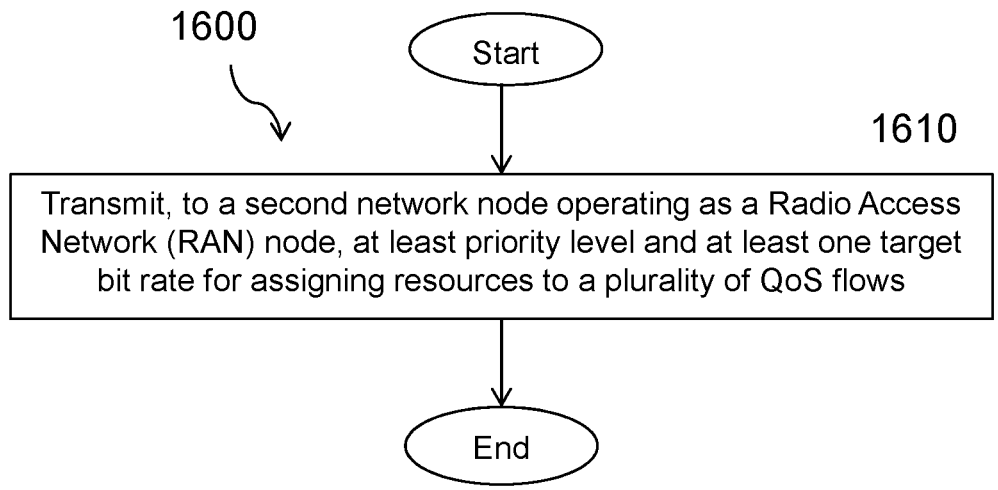
FIG. 20 illustrates another example method by a network node operating as a Radio Access Network (RAN) node for dynamic scheduling prioritization for live uplink streaming.

FIG. 20 illustrates an example method 1600 by a first network node 715 operating as a Core Network node for dynamic scheduling prioritization for live uplink streaming. At step 1610, the first network node transmits, to a second network node operating as a RAN node, at least one priority level and at least one target bit rate for assigning resources to a plurality of QoS flows.

According to a particular embodiment, the at least one target bit rate is greater than a GBR and less than a MBR.

Certain embodiments may comprise more or fewer actions, and the actions may be performed in any suitable order.

Figure 21:
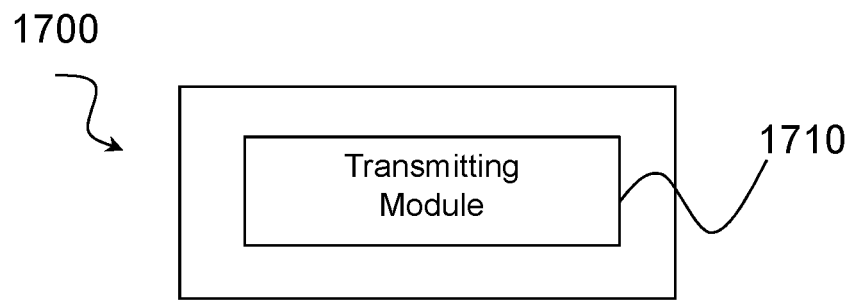
FIG. 21 illustrates an example virtual computing device for dynamic scheduling prioritization for live uplink streaming, according to certain embodiments.

In certain embodiments, the method for dynamic scheduling prioritization for live downlink streaming may be performed by a virtual computing device. FIG. 21 illustrates an example virtual computing device 1700 for dynamic scheduling prioritization for live downlink streaming, according to certain embodiments. In certain embodiments, virtual computing device 1700 may include modules for performing steps similar to those described above with regard to the method illustrated and described in FIG. 20. For example, virtual computing device 1700 may include a transmitting module 1710 and any other suitable modules for providing scheduling prioritization for live downlink streaming. In some embodiments, one or more of the modules may be implemented using processing circuitry 920 of FIG. 13. In certain embodiments, the functions of two or more of the various modules may be combined into a single module.

The transmitting module 1710 may perform certain of the transmitting functions of virtual computing device 1700. For example, in a particular embodiment, transmitting module 1710 may transmit, to a second network node operating as a RAN node, at least one priority level and at least one target bit rate for assigning resources to a plurality of QoS flows.

Other embodiments of virtual computing device 1700 may include additional components beyond those shown in FIG. 21 that may be responsible for providing certain aspects of the network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 22:
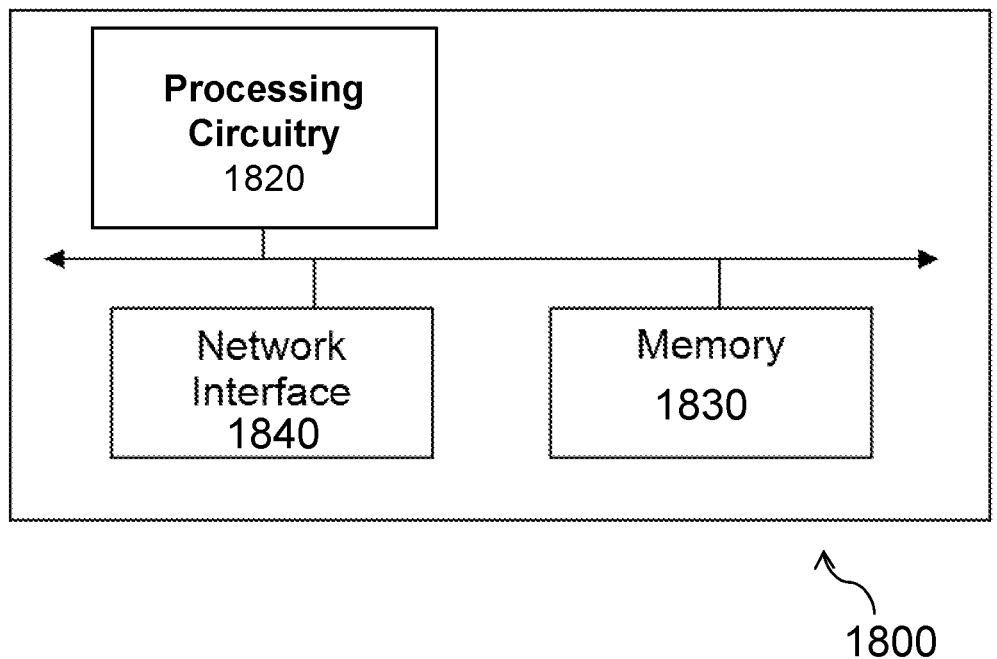
FIG. 22 illustrates an exemplary radio network controller or core network node, according to certain embodiments.

FIG. 22 illustrates an example radio network controller or core network node 1800, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node includes processing circuitry 1820 (e.g., which may include one or more processors), network interface 1830, and memory 1840. In some embodiments, processing circuitry 1820 executes instructions to provide some or all of the functionality described above as being provided by the network node, memory 1840 stores the instructions executed by processing circuitry 1820, and network interface 1830 communicates signals to any suitable node, such as a gateway, switch, router, Internet, Public Switched Telephone Network (PSTN), network nodes 715, radio network controllers or core network nodes, etc.

Processing circuitry 1820 may include any suitable combination of hardware and software implemented in one or more modules to execute instructions and manipulate data to perform some or all of the described functions of the radio network controller or core network node. In some embodiments, processing circuitry 1820 may include, for example, one or more computers, one or more central processing units (CPUs), one or more microprocessors, one or more applications, and/or other logic.

Memory 1840 is generally operable to store instructions, such as a computer program, software, an application including one or more of logic, rules, algorithms, code, tables, etc. and/or other instructions capable of being executed by a processor. Examples of memory 1840 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1830 is communicatively coupled to processing circuitry 1820 and may refer to any suitable device operable to receive input for the network node, send output from the network node, perform suitable processing of the input or output or both, communicate to other devices, or any combination of the preceding. Network interface 1830 may include appropriate hardware (e.g., port, modem, network interface card, etc.) and software, including protocol conversion and data processing capabilities, to communicate through a network.

Other embodiments of the network node may include additional components beyond those shown in FIG. 18 that may be responsible for providing certain aspects of the network node's functionality, including any of the functionality described above and/or any additional functionality (including any functionality necessary to support the solution described above).

Figure 23:
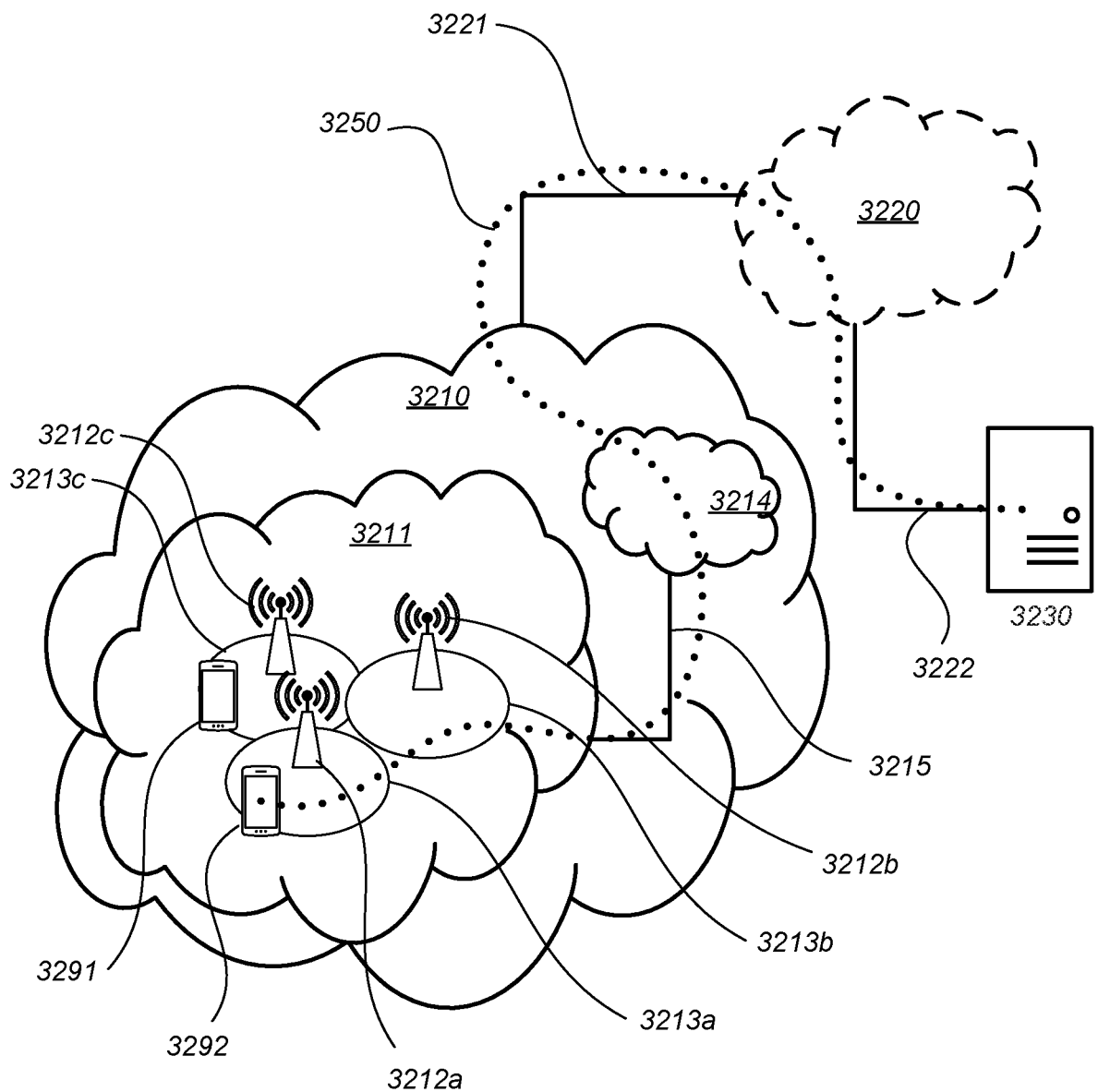
FIG. 23 illustrates a telecommunication network connected via an intermediate network to a host computer, according to certain embodiments.

FIG. 23 schematically illustrates a telecommunication network connected via an intermediate network to a host computer, according to certain embodiments. In accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The wireless communication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the wireless communication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 21 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Figure 24:
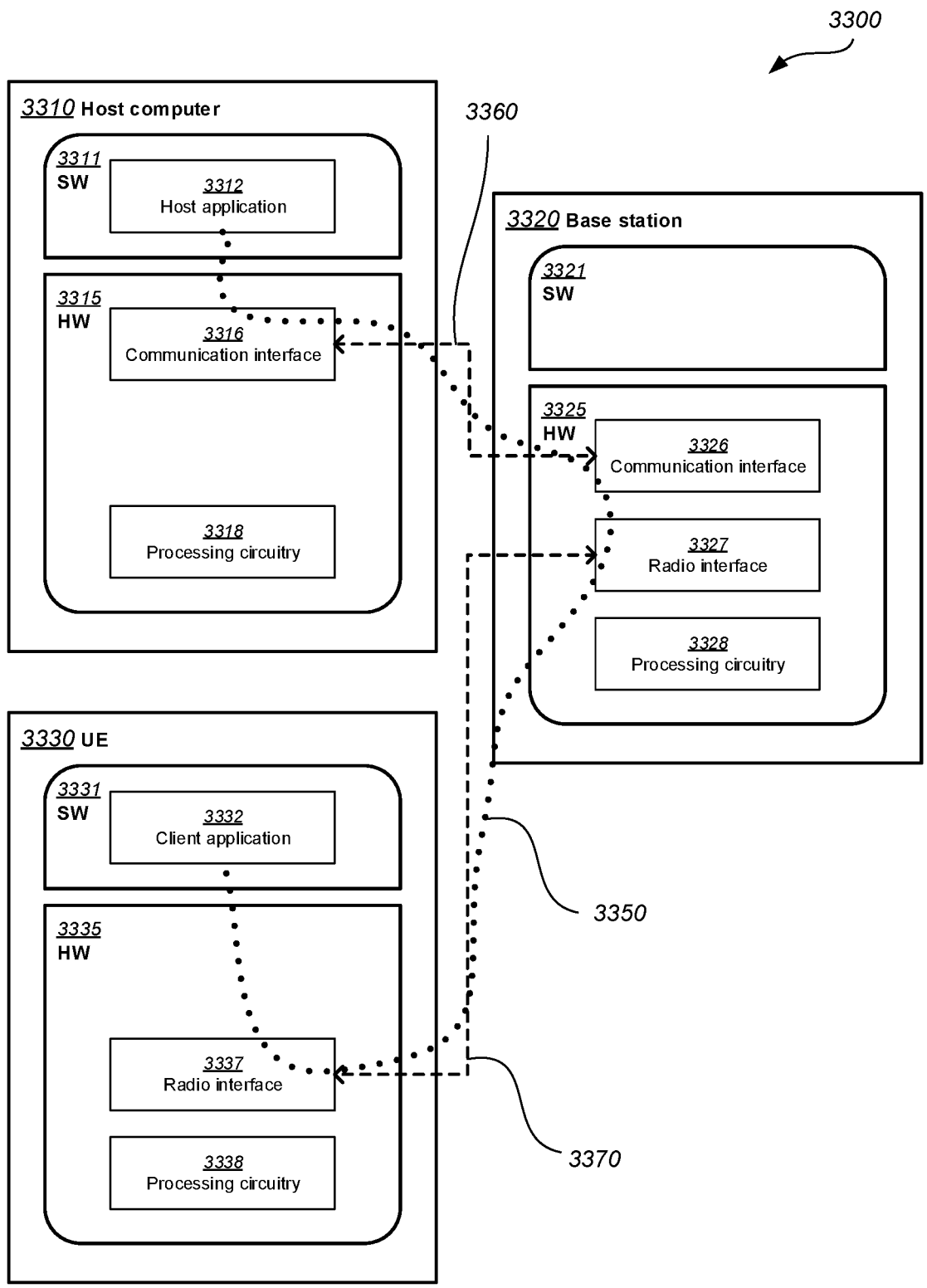
FIG. 24 illustrates a generalized block diagram of a host computer communicating via a base station with a user equipment over a partially wireless connection, according to certain embodiments.

FIG. 24 is a generalized block diagram of a host computer communicating via a base station with a user equipment over a partially wireless connection, according to certain embodiments. Example implementations, in accordance with an embodiment, of the UE, base station and host computer discussed in the preceding paragraphs will now be described with reference to FIG. 24. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 24) served by the base station 3320. The communication interface 3326 may be configured to facilitate a connection 3360 to the host computer 3310. The connection 3360 may be direct or it may pass through a core network (not shown in FIG. 24) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

It is noted that the host computer 3310, base station 3320 and UE 3330 illustrated in FIG. 24 may be identical to the host computer 3230, one of the base stations 3212a, 3212b, 3212c and one of the UEs 3291, 3292 of FIG. 23, respectively. This is to say, the inner workings of these entities may be as shown in FIG. 24 and independently, the surrounding network topology may be that of FIG. 23.

In FIG. 24, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 25:
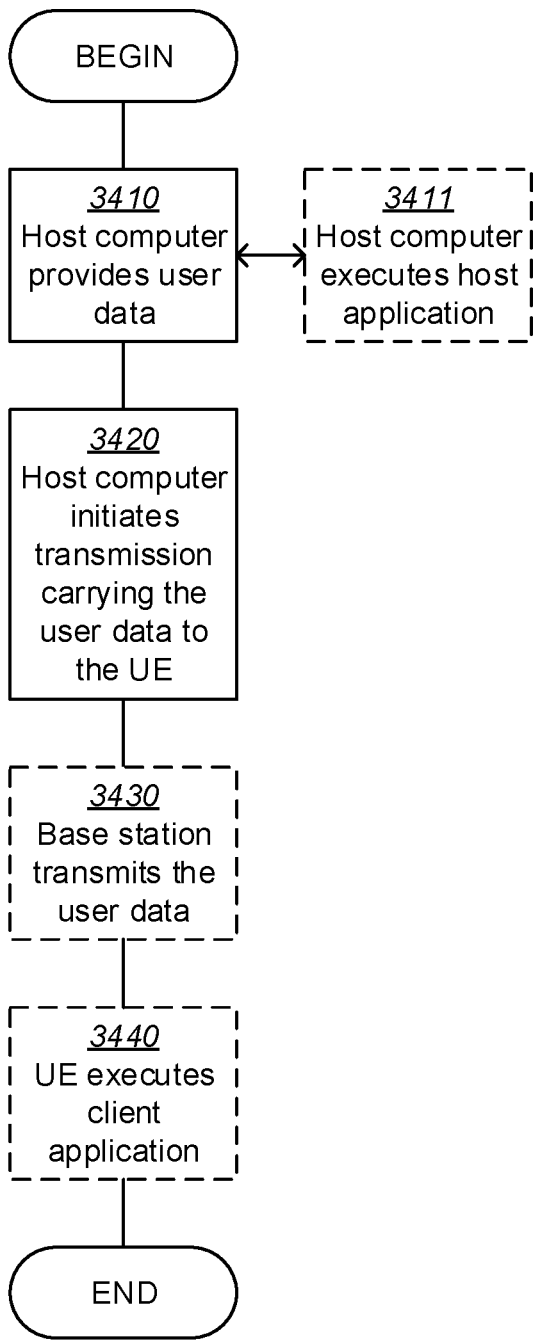
FIG. 25 illustrates a method implemented in a communication system, according to one embodiment.

FIG. 25 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 25 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 26:
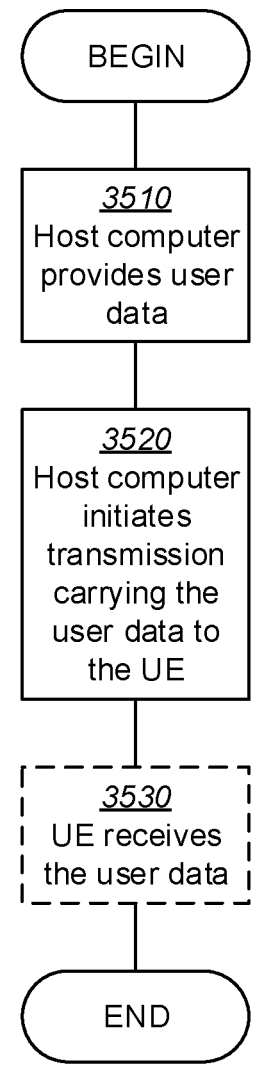
FIG. 26 illustrates another method implemented in a communication system, according to one embodiment.

FIG. 26 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 26 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 27:
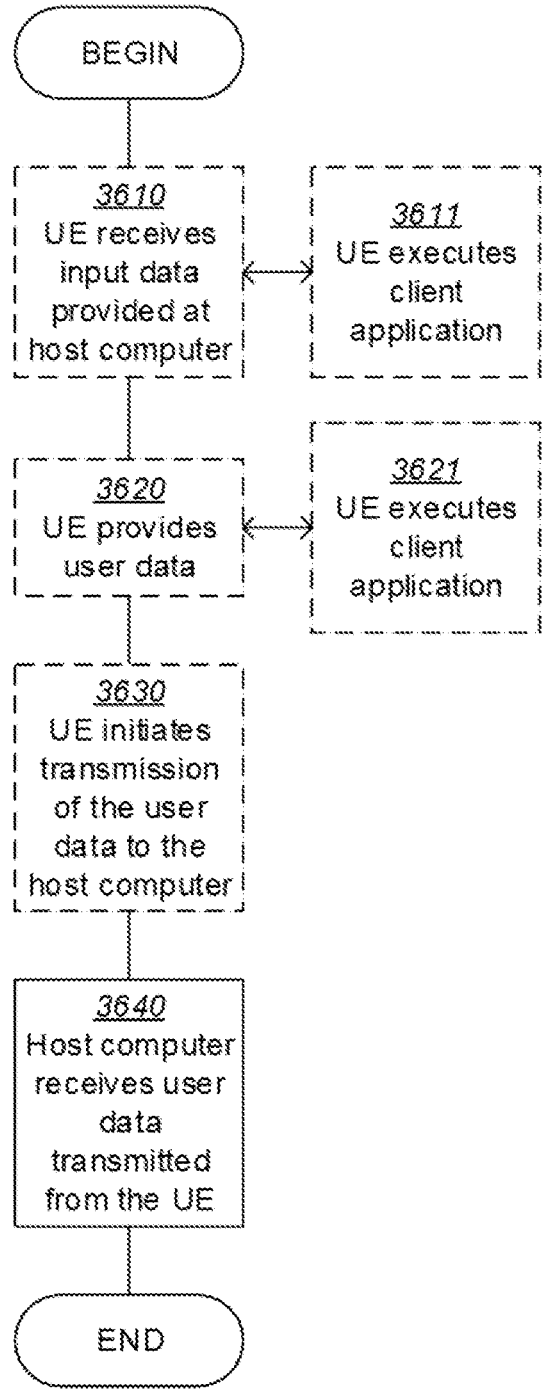
FIG. 27 illustrates another method implemented in a communication system, according to one embodiment.

FIG. 27 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 27 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 28:
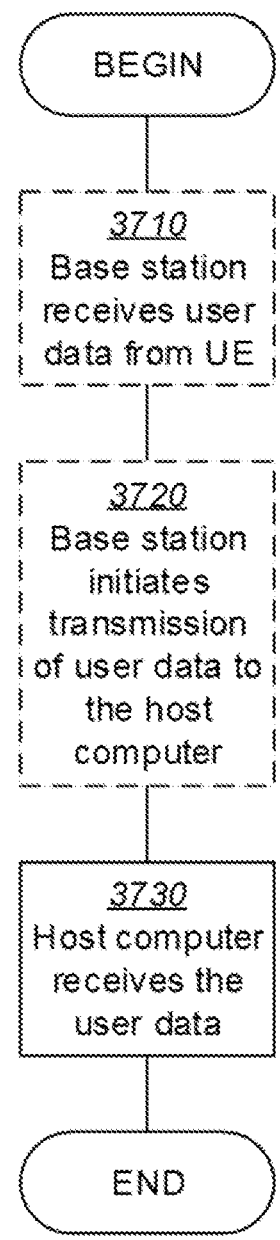
FIG. 28 illustrates another method implemented in a communication system, according to one embodiment.

FIG. 28 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 28 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

EXAMPLE EMBODIMENTS

Embodiment 1. A method by a network node for dynamic scheduling prioritization for live uplink streaming, the method comprising:
  determining that a first traffic bit rate (BR) granted to a wireless device for a traffic flow is above a lowest expected bit rate (GBR) and below a maximum expected bit rate (MBR); and
  assigning a scheduling priority level to the traffic flow, wherein the scheduling priority level is dynamically assigned such that:
    the scheduling priority level for the traffic flow approaches a lowest priority as the first traffic BR approaches the MBR; and
    the scheduling priority level for the traffic flow approaches a highest priority as the first traffic BR approaches the GBR.

Embodiment 2. The method of embodiment 1, further comprising:
  assigning one or more resources to the traffic flow based on the dynamically assigned scheduling priority level; and
  transmitting, to the wireless device, an uplink grant identifying the one or more resources assigned to the first traffic flow.

Embodiment 3. The method of any one of embodiments 1 to 2, further comprising:
  receiving data associated with the uplink grant from the wireless device;
  determining a second traffic BR of the data within the traffic flow;
  determining that the second traffic BR associated with the uplink grant is above a lowest expected bit rate (GBR) and below a maximum expected bit rate (MBR); and
  adjusting the scheduling priority level assigned to the traffic flow such that:
    the adjusted scheduling priority level for the traffic flow approaches the lowest priority as the second traffic BR approaches the MBR; and
    the adjusted scheduling priority level for the traffic flow approaches the highest priority as the second traffic BR approaches the GBR.

Embodiment 4. The method of any of embodiments 1 to 3, wherein the scheduling priority level is dynamically assigned based on a target bit rate for the traffic flow, the target bit rate being greater than the GBR and less than the MBR.

Embodiment 5. The method of embodiment 4, further comprising transmitting, to a wireless device, an access network bitrate recommendation (ANBR) that is greater than the GBR and less than the MBR, the ANBR being selected based on a bit rate below the MBR that is currently feasible.

Embodiment 6. The method of embodiment 5, further comprising transmitting, to the wireless device, an indication of a duration of time for using the ANBR.

Embodiment 7. The method of any one of embodiments 1 to 6, wherein a variation in the scheduling priority between the lowest priority as the first traffic BR approaches the MBR and the highest priority as the first traffic BR approaches the GBR is linear.

Embodiment 8. The method of any one of embodiments 1 to 6, wherein a variation in the scheduling priority between the lowest priority as the first traffic BR approaches the MBR and the highest priority as the first traffic BR approaches the GBR is non-linear.

Embodiment 9. A computer program comprising instructions which when executed on a computer perform any of the methods of embodiments 1 to 8.

Embodiment 10. A computer program product comprising computer program, the computer program comprising instructions which when executed on a computer perform any of the methods of embodiments 1 to 8.

Embodiment 11. A non-transitory computer readable medium storing instructions which when executed by a computer perform any of the methods of embodiments 1 to 8.

Embodiment 12. A method implemented in a communication system including a host computer, a base station and a user equipment (UE), the method comprising:
at the host computer, receiving, from the base station, user data originating from a transmission which the base station has received from the UE, wherein the base station
determining that a first traffic bit rate (BR) granted to the UE for a traffic flow is above a lowest expected bit rate (GBR) and below a maximum expected bit rate (MBR); and
assigning a scheduling priority level to the traffic flow, wherein the scheduling priority level is dynamically assigned such that:
the scheduling priority level for the traffic flow approaches a lowest priority as the first traffic BR approaches the MBR; and
the scheduling priority level for the traffic flow approaches a highest priority as the first traffic BR approaches the GBR.

Embodiment 13. The method of embodiment 12, further comprising:
at the base station, receiving the user data from the UE.

Embodiment 14. The method of embodiment 13, further comprising:
at the base station, initiating a transmission of the received user data to the host computer.

Embodiment 15. A network node for dynamic scheduling prioritization for live uplink streaming, the network node comprising:
processing circuitry configured to:
determine that a first traffic bit rate (BR) granted to a wireless device for a traffic flow is above a lowest expected bit rate (GBR) and below a maximum expected bit rate (MBR); and
assign a scheduling priority level to the traffic flow, wherein the scheduling priority level is dynamically assigned such that:
the scheduling priority level for the traffic flow approaches a lowest priority as the first traffic BR approaches the MBR; and
the scheduling priority level for the traffic flow approaches a highest priority as the first traffic BR approaches the GBR.

Embodiment 16. The network node of embodiment 15, wherein the processing circuitry is further configured to:
assign one or more resources to the traffic flow based on the dynamically assigned scheduling priority level; and
transmit, to the wireless device, an uplink grant identifying the one or more resources assigned to the first traffic flow.

Embodiment 17. The network node of any one of embodiments 15 to 16, wherein the processing circuitry is further configured to:
receive data associated with the uplink grant from the wireless device;
determine a second traffic BR of the data within the traffic flow;
determine that the second traffic BR associated with the uplink grant is above a lowest expected bit rate (GBR) and below a maximum expected bit rate (MBR); and
adjust the scheduling priority level assigned to the traffic flow such that:
the adjusted scheduling priority level for the traffic flow approaches the lowest priority as the second traffic BR approaches the MBR; and
the adjusted scheduling priority level for the traffic flow approaches the highest priority as the second traffic BR approaches the GBR.

Embodiment 18. The network node of any one of embodiments 15 to 17, wherein the scheduling priority level is dynamically assigned based on a target bit rate for the traffic flow, the target bit rate being greater than the GBR and less than the MBR.

Embodiment 19. The network node of embodiment 18, further comprising transmitting, to a wireless device, an access network bitrate recommendation (ANBR) that is greater than the GBR and less than the MBR, the ANBR being selected based on a bit rate below the MBR that is currently feasible.

Embodiment 20. The network node of embodiment 19, further comprising transmitting, to the wireless device, an indication of a duration of time for using the ANBR.

Embodiment 21. The network node of any one of embodiments 15 to 20, wherein a variation in the scheduling priority between the lowest priority as the first traffic BR approaches the MBR and the highest priority as the first traffic BR approaches the GBR is linear.

Embodiment 22. The network node of any one of embodiments 15 to 20, wherein a variation in the scheduling priority between the lowest priority as the first traffic BR approaches the MBR and the highest priority as the first traffic BR approaches the GBR is non-linear.

Embodiment 23. A communication system including a host computer comprising a communication interface configured to receive user data originating from a transmission from a user equipment (UE) to a base station, wherein the base station comprises a radio interface and processing circuitry, the base station's processing circuitry configured to
determine that a first traffic bit rate (BR) granted to the UE for a traffic flow is above a lowest expected bit rate (GBR) and below a maximum expected bit rate (MBR); and
assign a scheduling priority level to the traffic flow, wherein the scheduling priority level is dynamically assigned such that:
the scheduling priority level for the traffic flow approaches a lowest priority as the first traffic BR approaches the MBR; and
the scheduling priority level for the traffic flow approaches a highest priority as the first traffic BR approaches the GBR.

Embodiment 24. The communication system of embodiment 23, further including the base station.

Embodiment 25. The communication system of embodiment 24, further including the UE, wherein the UE is configured to communicate with the base station.

Embodiment 26. The communication system of embodiment 25, wherein:
the processing circuitry of the host computer is configured to execute a host application;

the UE is configured to execute a client application associated with the host application, thereby providing the user data to be received by the host computer.

Embodiment 27. A method by a network node for dynamic scheduling prioritization for live downlink streaming, the method comprising:

determining that a first traffic bit rate (BR) sent to a wireless device for a traffic flow is above a lowest expected bit rate (GBR) and below a maximum expected bit rate (MBR); and assigning a scheduling priority level to traffic flow, wherein the scheduling priority level is dynamically assigned such that:
  the scheduling priority level for the traffic flow approaches a lowest priority as the first traffic BR approaches the MBR; and
  the scheduling priority level for the traffic flow approaches a highest priority as the first traffic BR approaches the GBR.

Embodiment 28. The method of embodiment 27, further comprising:

assigning one or more resources to the traffic flow based on the dynamically assigned scheduling priority level.

Embodiment 29. The method of any one of embodiments 27 to 28, further comprising:

sending data to the wireless device;

determining a second traffic BR of the data within the traffic flow;

determining that the second traffic BR sent is above a lowest expected bit rate (GBR) and below a maximum expected bit rate (MBR); and adjusting the scheduling priority level assigned to the traffic flow such that:
  the adjusted scheduling priority level for the traffic flow approaches the lowest priority as the second traffic BR approaches the MBR; and
  the adjusted scheduling priority level for the traffic flow approaches the highest priority as the second traffic. BR approaches the GBR.

Embodiment 30. The method of any of embodiments 27 to 29, wherein the scheduling priority level is dynamically assigned based on a target bit rate for the traffic flow, the target bit rate being greater than the GBR and less than the MBR.

Embodiment 31. The method of any one of embodiments 27 to 30, wherein a variation in the scheduling priority between the lowest priority as the first traffic BR approaches the MBR and the highest priority as the first traffic BR approaches the GBR is linear.

Embodiment 32. The method of any one of embodiments 27 to 30, wherein a variation in the scheduling priority between the lowest priority as the first traffic BR approaches the MBR and the highest priority as the first traffic BR approaches the GBR is non-linear.

Embodiment 33. A computer program comprising instructions which when executed on a computer perform any of the methods of embodiments 27 to 32.

Embodiment 34. A computer program product comprising computer program, the computer program comprising instructions which when executed on a computer perform any of the methods of embodiments 27 to 32.

Embodiment 35. A non-transitory computer readable medium storing instructions which when executed by a computer perform any of the methods of embodiments 27 to 32.

Embodiment 36. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs determine that a first traffic bit rate (BR) sent to the UE for a traffic flow is above a lowest expected bit rate (GBR) and below a maximum expected bit rate (MBR); and assign a scheduling priority level to the traffic flow, wherein the scheduling priority level is dynamically assigned such that:
  the scheduling priority level for the traffic flow approaches a lowest priority as the first traffic BR approaches the MBR; and
  the scheduling priority level for the traffic flow approaches a highest priority as the first traffic BR approaches the GBR.

Embodiment 37. The method of embodiment 36, further comprising:

at the base station, transmitting the user data.

Embodiment 38. The method of embodiment 37, wherein the user data is provided at the host computer by executing a host application, the method further comprising:

at the UE, executing a client application associated with the host application.

Embodiment 39. A network node for dynamic scheduling prioritization for live uplink streaming, the network node comprising:

processing circuitry configured to:

determine that a first traffic bit rate (BR) sent to a wireless device for a traffic flow is above a lowest expected bit rate (GBR) and below a maximum expected bit rate (MBR); and assign a scheduling priority level to the traffic flow, wherein the scheduling priority level is dynamically assigned such that:
  the scheduling priority level for the traffic flow approaches a lowest priority as the first traffic BR approaches the MBR; and
  the scheduling priority level for the traffic flow approaches a highest priority as the first traffic BR approaches the GBR.

Embodiment 40. The network node of embodiment 39, wherein the processing circuitry is further configured to:

assign one or more resources to the traffic flow based on the dynamically assigned scheduling priority level.

Embodiment 41. The network node of any one of embodiments 39 to 40, wherein the processing circuitry is further configured to:

send data to the wireless device;

determine a second traffic BR of the data within the traffic flow;

determine that the second traffic BR sent is above a lowest expected bit rate (GBR) and below a maximum expected bit rate (MBR); and adjust the scheduling priority level assigned to the traffic flow such that:
  the adjusted scheduling priority level for the traffic flow approaches the lowest priority as the second traffic BR approaches the MBR; and
  the adjusted scheduling priority level for the traffic flow approaches the highest priority as the second traffic BR approaches the GBR.

Embodiment 42. The method of any of embodiments 39 to 41, wherein the scheduling priority level is dynamically assigned based on a target bit rate for the traffic flow, the target bit rate being greater than the GBR and less than the MBR.

Embodiment 43. The method of any one of embodiments 39 to 42, wherein a variation in the scheduling priority between the lowest priority as the first traffic BR approaches the MBR and the highest priority as the first traffic BR approaches the GBR is linear.

Embodiment 44. The method of any one of embodiments 39 to 42, wherein a variation in the scheduling priority between the lowest priority as the first traffic BR approaches the MBR and the highest priority as the first traffic BR approaches the GBR is non-linear.

Embodiment 45. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to:
    determine that a first traffic bit rate (BR) sent to the UE for a traffic flow is above a lowest expected bit rate (GBR) and below a maximum expected bit rate (MBR); and
    assign a scheduling priority level to the traffic flow, wherein the scheduling priority level is dynamically assigned such that:
      the scheduling priority level for the traffic flow approaches a lowest priority as the first traffic BR approaches the MBR; and
      the scheduling priority level for the traffic flow approaches a highest priority as the first traffic BR approaches the GBR.

Embodiment 46. The communication system of embodiment 45, further including the base station.

Embodiment 47. The communication system of embodiment 46, further including the UE, wherein the UE is configured to communicate with the base station.

Embodiment 48. The communication system of embodiment 47, wherein:
  the processing circuitry of the host computer is configured to execute a host application, thereby providing the user data; and
  the UE comprises processing circuitry configured to execute a client application associated with the host application.

RELEVANT 3GPP SECTIONS

In the current Rel 15 QoS framework, the Allocation and Retention Priority defines the priority in Admission Control:
  5.7.2.2 ARP
  The QoS parameter ARP contains information about the ARP priority level, the pre-emption capability and the pre-emption vulnerability. The ARP priority level defines the relative importance of a resource request. This allows deciding whether a new QoS Flow may be accepted or needs to be rejected in case of resource limitations (typically used for admission control of GBR traffic). It may also be used to decide which existing QoS Flow to pre-empt during resource limitations.
  The range of the ARP priority level is 1 to 15 with 1 as the highest level of priority. The pre-emption capability information defines whether a service data flow may get resources that were already assigned to another service data flow with a lower priority level. The pre-emption vulnerability information defines whether a service data flow may lose the resources assigned to it in order to admit a service data flow with higher priority level. The pre-emption capability and the pre-emption vulnerability shall be either set to 'yes' or 'no'.

There are two bit rate parameters available to a QoS Flow, GFBR and MFBR:
  3GPP TS 23.501 V15.0.0 (December 2017)
  5.7.2.5 Flow Bit Rates
  For GBR QoS Flows, the 5G QoS profile additionally include the following QoS parameters:
    Guaranteed Flow Bit Rate (GFBR)—UL and DL;
    Maximum Flow Bit Rate (MFBR)—UL and DL.
  The GFBR denotes the bit rate that may be expected to be provided by a GBR QoS Flow. The MFBR limits the bit rate that may be expected to be provided by a GBR QoS Flow (e.g. excess traffic may get discarded by a rate shaping function).

The 3GPP QoS framework leaves the behavior of the scheduler above the GFBR bit rate value open to implementation, as stated in the QoS characteristic "Priority Level" associated with the 5QI/QCI parameter:
  5.7.3.3 Priority Level
  The Priority level indicate a priority in scheduling resources among QoS Flows. The Priority levels shall be used to differentiate between QoS Flows of the same UE, and it shall also be used to differentiate between QoS Flows from different UEs. Once all QoS requirements are fulfilled for the GBR QoS Flows, spare resources can be used for any remaining traffic in an implementation specific manner. The lowest Priority level value corresponds to the highest Priority.
  The priority level may be signalled with standardized 5QIs, and if it is received, it overwrites the default value specified in QoS characteristics Table 5.7.4.1.

The 3GPP QoS framework is described similarly in 3GPP TS 23.401 V15.2.0 (December 2017):
  4.7.3 Bearer level QoS parameters
  [ . . . ]
  Each GBR bearer is additionally associated with the following bearer level QoS parameters:
    Guaranteed Bit Rate (GBR);
    Maximum Bit Rate (MBR).
  The GBR denotes the bit rate that can be expected to be provided by a GBR bearer. The MBR limits the bit rate that can be expected to be provided by a GBR bearer (e.g. excess traffic may get discarded by a rate shaping function). See clause 4.7.4 for further details on GBR and MBR:
  4.7.4 Support for Application/Service Layer Rate Adaptation
  [ . . . ]
  The MBR of a particular GBR bearer may be set larger than the GBR.

Note, it would be possible to update the GBR value of a QoS bearer. However, the system does not trigger a renegotiation procedure before dropping a QoS bearer.

But the framework leaves the behavior of the scheduler above the GFBR bit rate value open to implementation:
  5.7.3.3 Priority Level
  The Priority level indicate a priority in scheduling resources among QoS Flows. The Priority levels shall be used to differentiate between QoS Flows of the same UE, and it shall also be used to differentiate between QoS Flows from different UEs. Once all QoS requirements are fulfilled for the GBR QoS Flows, spare resources can be used for any remaining traffic in an implementation specific manner. The lowest Priority level value corresponds to the highest Priority.

In our view two possible strategy can be chosen to improve the existing framework:

1) Act in SA4 and SA2 to introduce a requirement in 23.401 and 23.501 on the bitrates above GFBR provided by a GBR QoS Flow/EPS bearer. For example: The GFBR denotes the bit rate that may be expected to be provided by a GBR QoS Flow. The MFBR limits the bit rate that may be expected to be provided by a GBR QoS Flow (e.g. excess traffic may get discarded by a rate shaping function). Bit rates above the GFBR value and up to the MFBR value may be provided by a GBR QoS Flow based on its priority in scheduling resources among QoS Flows At this point we do not see the need of introducing new QoS parameters to request a specific behaviour of the scheduler in the GFBR to MFBR bit rate region.

2) Do not raise the issue in 3GPP and develop a proprietary solution for differentiating QoS flows in the GFBR to MFBR bit rate region.

ABBREVIATIONS

| Abbreviation | Explanation |
| --- | --- |
| 3GPP | $3^{rd}$ Generation Partnership Project |
| 5G | $5^{th}$ Generation |
| 5QI | 5G QoS Identifier |
| ANBR | Access Network Bitrate Recommendation |
| AP | Access Point |
| ASIC | Application Specific Integrated Circuit |
| BS | Base Station |
| BSC | Base Station Controller |
| BTS | Base Transceiver Station |
| CD | Compact Disk |
| CPU | Central Processing Unit DL Downlink |
| D2D | Device to Device |
| DAS | Distributed Antenna System |
| DVD | Digital Video Disk |
| eNB | Evolved NodeB |
| EPS | Evolved Packet System |
| FLUS | Live Uplink Streaming |
| FPGA | Field Programmable Gate Arrays |
| GBR | Guaranteed Bit Rate |
| GFBR | Guaranteed Flow Bit Rate |
| gNB | The term for a radio base station in NR (corresponding to eNB in LTE). |
| HTTP | Hypertext Transfer Protocol |
| IMS | IP Multimedia Subsystem |
| LAN | Land Area Network |
| LEE | Laptop Embedded Equipment |
| LME | Laptop Mounted Equipment |
| LTE | Long Term Evolution |
| MAN | Metropolitan Area Network |
| MBR | Maximum Bit Rate |
| MFBR | Maximum Flow Bit Rate |
| MSR | Multi-Standard Radio |
| MTC | Machine Type Communication |
| MTM | Machine To Machine |
| MTSI | Multimedia Telephony Service |
| NR | New Radio (The term used for the 5G radio interface and radio access network in the technical reports and standard specifications 3GPP are working on.) |
| PCF | Policy Control Function |
| P-CSCF | Proxy-Call Session Control Function |
| PDA | Personal Digital Assistant |
| PSTN | Public Switched Telephone Network |
| QCI | Quality of Service Class Identifier |
| OFDM | Orthogonal Frequency Division Multiple Access |
| QoS | Quality of Service |
| RAN | Radio Access Network |
| RAM | Random Access Memory |
| RNC | Radio Network Controller |
| ROM | Read-Only Memory |
| RRH | Remote Radio Head |
| RRU | Remote Radio Unit |
| SIP | Session Initiation Protocol |
| STA | Station |
| UE | User Equipment |
| UL | Uplink |
| WAN | Wide Area Network |

CONCLUSION

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method by a first network node operating as a Radio Access Network (RAN) node for dynamic scheduling prioritization for live uplink streaming, the method comprising:
   receiving at least one priority level;
   based on the at least one priority level, determining an expected quality level, the expected quality level being defined as a Quality of Service (QoS) of a QoS flow being scheduled with a service quality above a minimum quality level and below a maximum quality level;
   deriving a current service quality for a plurality of QoS flows; and
   based on the combined current service quality and the expected quality level, determining a scheduling priority for assigning resources to a plurality of QoS flows.

2. The method of 1, wherein, at least one of the minimum quality level and the maximum quality level are derived from a QoS profile.

3. The method of claim 1, wherein
   the minimum quality level comprises a lowest expected bit rate (GBR) and the maximum quality level comprises a maximum expected hit rate (MBR).

4. The method of claim 1, wherein:
   the at least one scheduling priority for a first QoS flow of the plurality of QoS flows approaches a lowest priority as a bitrate of the first QoS flow approaches a maximum expected bit rate (MBR); and
   the at least one scheduling priority for the first QoS flow of the plurality of QoS flows approaches a highest priority as the bitrate of the first QoS flow approaches a lowest expected bit rate (GBR).

5. The method of claim 4, further comprising transmitting, to a wireless device, an access network bitrate recommendation (ANBR) that is greater than the GBR and less than the MBR, the ANBR being selected based on a bit rate below the MBR that is currently feasible based on the at least one scheduling priority.

6. The method of claim 5, further comprising transmitting, to the wireless device, an indication of a duration of time for using the ANBR.

7. The method of claim 1, further comprising:
transmitting, to the wireless device, an uplink grant identifying one or more resources assigned, based on the scheduling priority, to a first QoS flow of the plurality of QoS flows.

8. The method of claim 7, further comprising:
receiving data associated with the uplink grant from the wireless device;
deriving a current service quality based on the received data; and
adjusting the at least one scheduling priority assigned to the first QoS flow.

9. The method of claim 1, further comprising obtaining at least one additional parameter and wherein the at least one additional parameter is also used when assigning the resources to the plurality of QoS flows.

10. A first network node operating as a Radio Access Network (RAN) node for dynamic scheduling prioritization for live uplink streaming, the first network node comprising:
processing circuitry configured to:
receive at least one priority level;
based on the at least one priority level, determine an expected quality level, the expected quality level being defined as a Quality of Service (QoS) of a QoS flow being scheduled with a service quality above a minimum quality level and below a maximum quality level;
derive a current service quality for a plurality of QoS flows; and
based on the combined current service quality and the expected quality level, determine a scheduling priority for assigning resources to a plurality of QoS flows.

11. The first network node of 10, wherein, at least one of the minimum quality level and the maximum quality level are derived from a QoS profile.

12. The first network node of claim 10, wherein
the minimum quality level comprises a lowest expected bit rate (GBR) and the maximum quality level comprises a maximum expected bit rate (MBR).

13. The first network node of claim 10 wherein:
the at least one scheduling priority for a first QoS flow of the plurality of QoS flows approaches a lowest priority as a bitrate of the first QoS flow approaches a maximum expected bit rate (MBR); and
the at least one scheduling priority for the first QoS flow of the plurality of QoS flows approaches a highest priority as the bitrate of the first QoS flow approaches a lowest expected bit rate (GBR).

14. The first network node of claim 13, wherein the processing circuitry is configured to transmit, to a wireless device, an access network nitrate recommendation (ANBR) that is greater than the GBR and less than the MBR, the ANBR being selected based on a bit rate below the MBR that is currently feasible based on the at least one scheduling priority.

15. The first network node of claim 14, wherein the processing circuitry is configured to transmit, to the wireless device, an indication of a duration of time for using the ANBR.

16. The first network node of claim 10, wherein the processing circuitry is configured to transmit, to the wireless device, an uplink grant identifying one or more resources assigned, based on the scheduling priority, to a first QoS flow of the plurality of QoS flows.

17. The first network node of claim 16, wherein the processing circuitry is configured to:
receive data associated with the uplink grant from the wireless device;
derive a current service quality based on the received data; and
adjust the at least one scheduling priority assigned to the first QoS flow.

18. The first network node of claim 10, wherein the processing circuitry is configured to obtain at least one additional parameter and wherein the at least one additional parameter is also used when assigning the resources to the plurality of QoS flows.

19. The first network node of claim 18, wherein the at least one additional parameter comprises at a target hit rate.

20. The first network node of claim 18, wherein the at least one additional parameter comprises a current bit rate, a traffic volume, a current channel condition, and a maximum delay.

21. The first network node of claim 10, wherein the at least one scheduling priority of a particular one of the plurality of QoS flows is assigned based on a target bit rate for the particular QoS flow, the target bit rate being greater than a lowest expected bit rate (GBR) and less than a maximum expected bit rate (MBR).

22. The first network node of claim 10, wherein:
the at least one scheduling priority for a first QoS flow of the plurality of QoS flows is given a lower priority as a bitrate of the first QoS flow increases above a target bit rate; and
the at least one scheduling priority for the first QoS flow of the plurality of QoS flows is given a higher priority as the bitrate of the first QoS flow decreases below a target bit rate.

23. A method by a first network node operating as a Core Network node for dynamic scheduling prioritization for live uplink streaming, the method comprising:
transmitting, to a second network node operating as a Radio Access Network (RAN) node, at least one priority level and at least one target bit rate for assigning resources to a plurality of Quality of Service (QoS) flows, such that:
based on the at least one priority level, an expected quality level is determined, the expected quality level being defined as a QoS of a QoS flow being scheduled with a service quality above a minimum quality level and below a maximum quality level;
a current service quality for the plurality of QoS flows is derived; and
based on the combined current service quality and the expected quality level, a scheduling priority for assigning resources to the plurality of QoS flows is determined.

24. The method of claim 23, wherein the at least one target bit rate is greater than a lowest expected bit rate (GBR) and less than a maximum expected bit rate (MBR).

25. A first network node operating as a Core Network node for dynamic scheduling prioritization for live uplink streaming, the first network node comprising:
  processing circuitry configured to:
    transmit, to a second network node operating as a Radio Access Network (RAN) node, at least one priority level and at least one target bit rate for assigning resources to a plurality of Quality of Service (QoS) flows such that:
  based on the at least one priority level, an expected quality level is determined, the expected quality level being defined as a QoS of a QoS flow being scheduled with a service quality above a minimum quality level and below a maximum quality level;
  a current service quality for the plurality of QoS flows is derived; and
  based on the combined current service quality and the expected quality level, a scheduling priority for assigning resources to the plurality of QoS flows is determined.

26. The first network node of claim 25, wherein the at least one target bit rate is greater than a lowest expected hit rate (GBR) and less than a maximum expected bit rate (MBR).

\* \* \* \* \*